United States Patent
Mineta et al.

(10) Patent No.: US 9,184,828 B2
(45) Date of Patent: Nov. 10, 2015

(54) COMMUNICATION SYSTEM, COMMUNICATION TERMINAL, COMMUNICATION METHOD, CHIP CLOCK GENERATION METHOD, AND ORTHOGONAL CODE GENERATION METHOD

(71) Applicant: Mitsubishi Electric Corporation, Chiyoda-ku (JP)

(72) Inventors: Nobuyuki Mineta, Chiyoda-ku (JP); Hiroyuki Sato, Chiyoda-ku (JP); Seiya Inoue, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/235,734

(22) PCT Filed: Jul. 9, 2013

(86) PCT No.: PCT/JP2013/068706
§ 371 (c)(1),
(2) Date: Jan. 28, 2014

(87) PCT Pub. No.: WO2014/030447
PCT Pub. Date: Feb. 27, 2014

(65) Prior Publication Data
US 2015/0078250 A1      Mar. 19, 2015

(30) Foreign Application Priority Data

Aug. 21, 2012  (JP) ................. 2012-182584
Aug. 21, 2012  (JP) ................. 2012-182585
Aug. 21, 2012  (JP) ................. 2012-182586
Aug. 21, 2012  (JP) ................. 2012-182587
Aug. 21, 2012  (JP) ................. 2012-182588

(51) Int. Cl.
*H04B 7/185*      (2006.01)
*H04B 7/216*      (2006.01)
(Continued)

(52) U.S. Cl.
CPC ............ *H04B 7/18513* (2013.01); *H04B 7/216* (2013.01); *H04J 13/10* (2013.01); *H04J 13/12* (2013.01); *H04W 84/06* (2013.01)

(58) Field of Classification Search
CPC ..... H04B 7/216; H04B 7/18513; H04J 13/12; H04W 84/06
See application file for complete search history.

(56) References Cited

U.S. PATENT DOCUMENTS 5,943,606 A  *  8/1999  Kremm et al. ............... 455/12.1
6,810,028 B1 * 10/2004  Giallorenzi et al. .......... 370/324
(Continued)

FOREIGN PATENT DOCUMENTS

JP     2002 057613    2/2002
JP     2004 289717   10/2004
(Continued)

OTHER PUBLICATIONS

Japanese Office Action issued Jul. 29, 2014, in Japan Patent Application No. 2012-182584 (with English translation).
(Continued)

*Primary Examiner* — Leon Flores
(74) *Attorney, Agent, or Firm* — Oblon, McClelland, Maier & Neustadt, L.L.P.

(57) ABSTRACT

When multiple communication terminals access a base station in CDMA in which transmission signals are spread with orthogonal codes, the orthogonal codes in CDMA signals transmitted from the communication terminals are synchronized on the communication path. The communication terminals each include an information acquirer acquiring reference time information common to the multiple communication terminals, a transmission time generator generating a chip clock on the basis of the time information, an orthogonal code generator generating orthogonal codes in time with the timing of the chip clock, a CDMA spreader spreading transmission signals with the orthogonal codes to generate code division multiple access signals, a carrier wave generator generating a carrier wave, and a BPSK modulator modulating the carrier wave generated by the carrier wave generator with the code division multiple access signals and transmitting the carrier wave.

20 Claims, 28 Drawing Sheets

(51) Int. Cl.
*H04J 13/10* (2011.01)
*H04J 13/12* (2011.01)
*H04W 84/06* (2009.01)

(56) References Cited

U.S. PATENT DOCUMENTS

2005/0270999 A1* 12/2005 Schiff et al. .................. 370/318
2007/0021121 A1 1/2007 Lane et al.

FOREIGN PATENT DOCUMENTS

| JP | 2006 253799 | 9/2006 |
| JP | 2008 502210 | 1/2008 |
| JP | 2009 503945 | 1/2009 |

OTHER PUBLICATIONS

Kameda, S. et al., "Feasibility Study on Wireless Access for Location and Short Message Communication System Using QZSS" The Institute of Electronics, Information and Communication Engineers, pp. 35-40, May 2012 (with English abstract).

Habuchi, H. "Pseudo-Noise Sequences Based on M-sequence and Its Application for Communications", Fundamentals Review, vol. 3, No. 1, pp. 32-42, Jul. 2009.

International Search Report Issued Aug. 13, 2013 in PCT/JP13/068706 Filed Jul. 9, 2013.

* cited by examiner

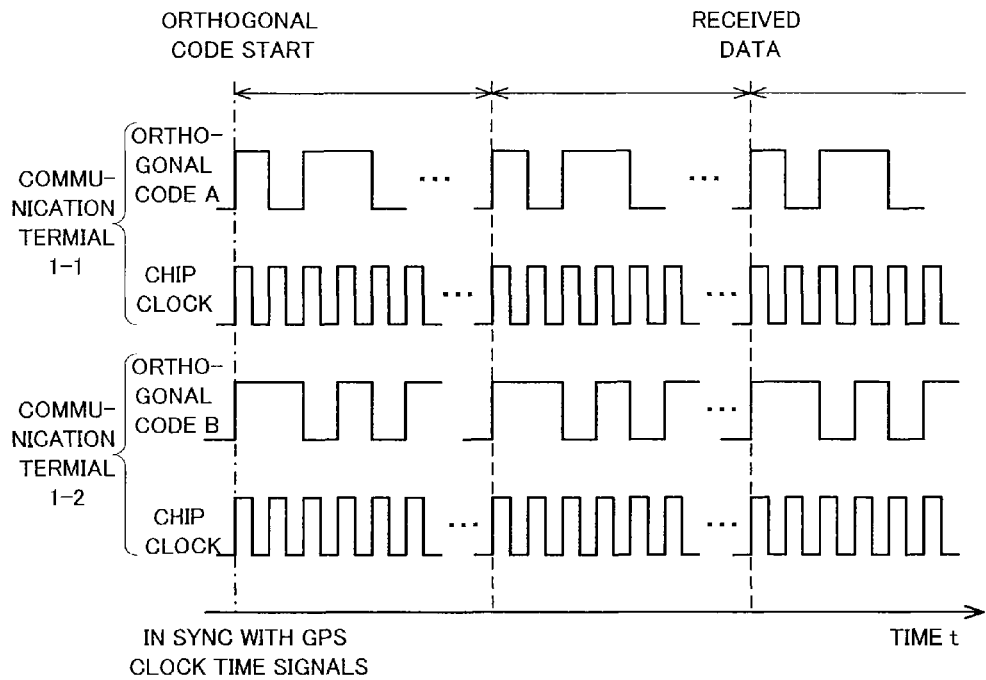
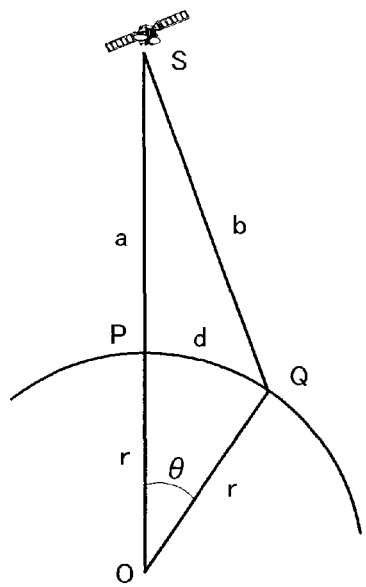

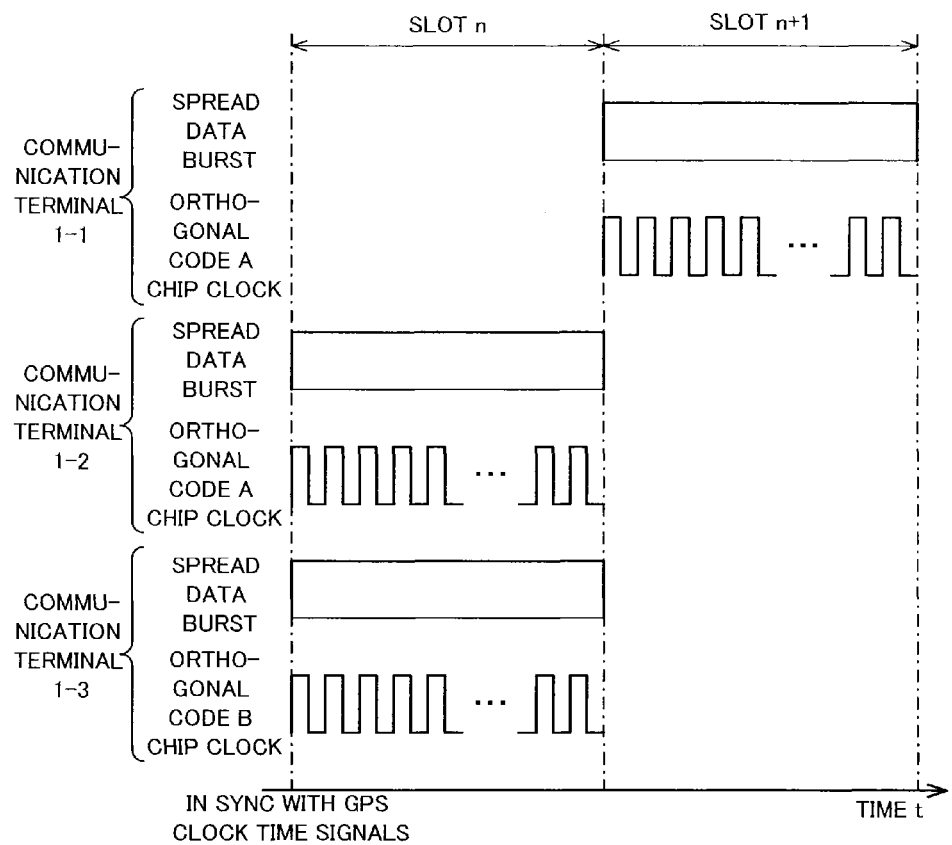

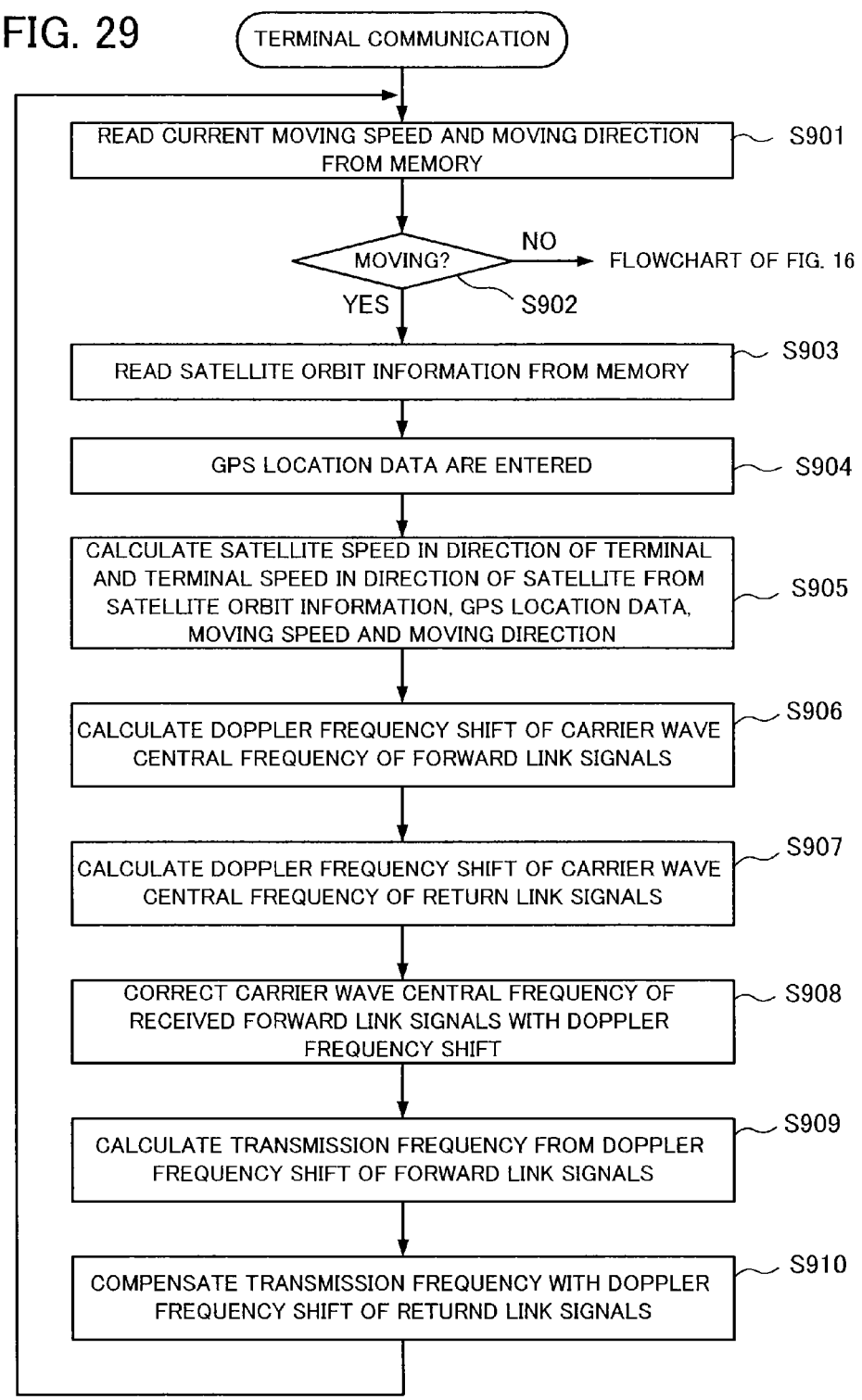

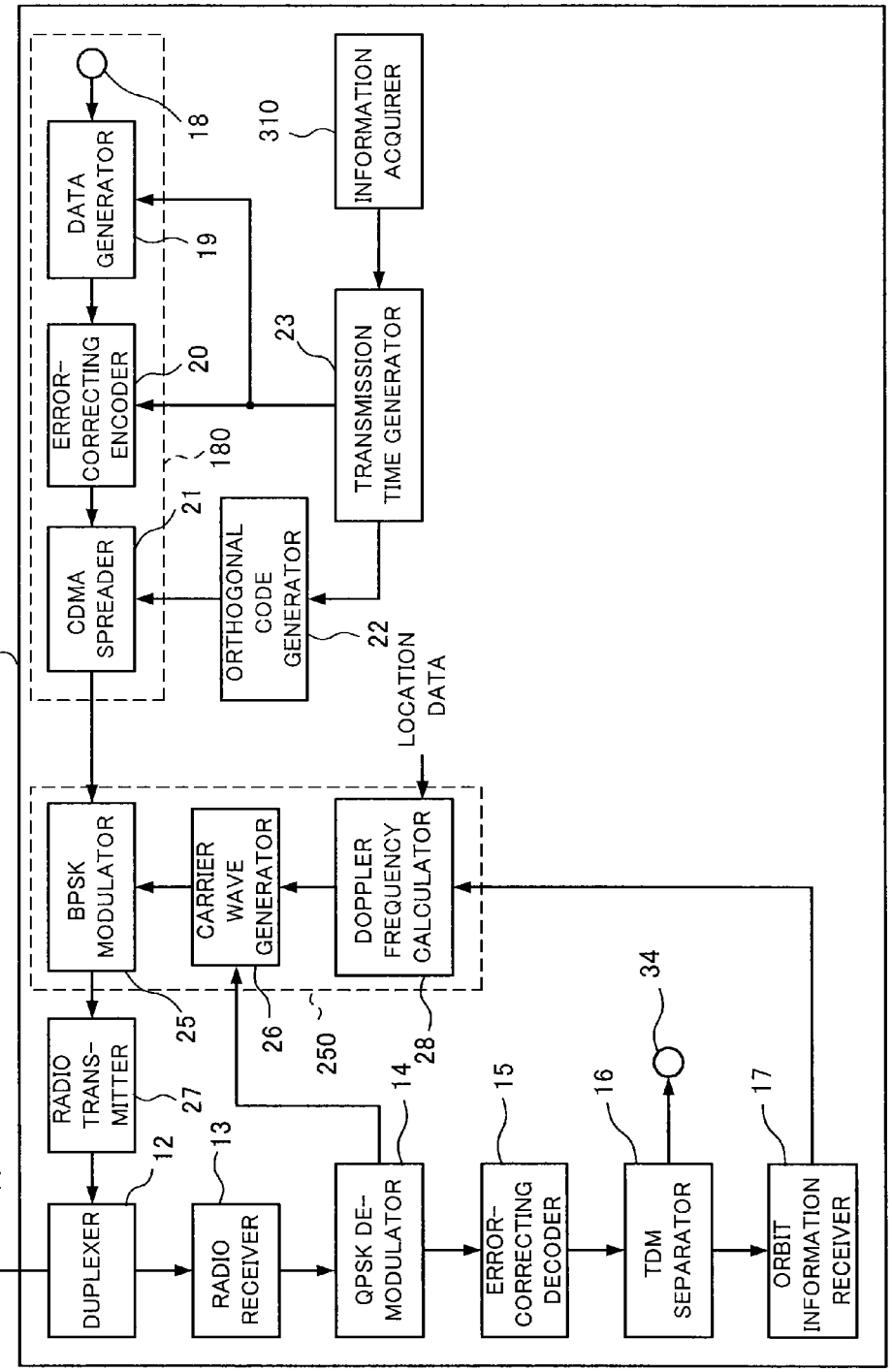

US 9,184,828 B2

COMMUNICATION SYSTEM, COMMUNICATION TERMINAL, COMMUNICATION METHOD, CHIP CLOCK GENERATION METHOD, AND ORTHOGONAL CODE GENERATION METHOD

TECHNICAL FIELD

The present invention relates to a communication system, communication terminal, communication method, chip clock generation method, and orthogonal code generation method for bidirectional radio communication between one base station and multiple communication terminals.

BACKGROUND ART

Satellite communication access systems in which multiple terminal devices transmit to a base station via a nongeostationary satellite such as a quasi-zenith satellite in code division multiple access (CDMA) are known. On the other hand, techniques using orthogonal codes as a spread code sequence for CDMA communication are known.

For example, Non Patent Literature 1 describes an orthogonal Gold code sequence as a spread code sequence for code division multiple access (CDMA) communication. The Non Patent Literature 1 states that the generated orthogonal Gold code sequences are orthogonal to each other with a shift of 0.

Patent Literature 1 discloses a satellite communication system conducting data communication between a terminal device and a base station via an artificial satellite. The satellite communication system of the Patent Literature 1 generates transmission synchronization signals dividing reference synchronization signals obtained using the global positioning system (GPS) and synchronized with the current time into multiple time divisions, and spread code generation signals dividing the transmission synchronization signals into multiple time divisions. Upon transmission of data, a random number is generated and the data transmission starts when the number of transmission synchronization signals following reference synchronization signals becomes equal to the value of the random number. Furthermore, using spread codes sequentially output in sync with spread code generation signals, the modulated wave based on the transmission data is spread in spectrum to generate transmission signals.

In the random access control method disclosed in Patent Literature 2, the base station notifies the terminal devices of given delay time information. The terminal devices spread their transmission data with the same spread code, and set and transmit the spread transmission data of which the delay time is individually adjusted based on the notified delay time information in a specified slot.

Furthermore, Patent Literature 3 discloses a technique used in bidirectional satellite communication between a parent station and a mobile unit via a nongeostationary satellite such as a quasi-zenith satellite for frequency-compensating the carrier wave Doppler frequency shift caused by movement of the nongeostationary satellite based on orbit information of the nongeostationary satellite and location information of the mobile unit.

Non Patent Literature 2 discloses a basic study on bidirectional communication systems using a nongeostationary satellite. The Non Patent Literature 2 refers to prospects of using a quasi-zenith satellite or GPS satellite and transmitting very short messages such as someone's safety information via the satellite (quasi-zenith satellite). The Non Patent Literature 2 also discloses compensation of the carrier wave frequency deviation using GPS signals and compensation of the transmission delay difference using GPS signals.

CITATION LIST

Patent Literature

Patent Literature 1: Unexamined Japanese Patent Application Kokai Publication No. 2002-57613;
Patent Literature 2: Unexamined Japanese Patent Application Kokai Publication No. 2004-289717; and
Patent Literature 3: Unexamined Japanese Patent Application Kokai Publication No. 2006-253799.

Non Patent Literature

Non Patent Literature 1: Hiromasa Habuchi, "Sequence formed based on M sequence and application thereof in communication," The Institute of Electronics, Information and Communication Engineers, Engineering Sciences Society, Fundamentals Review, Vol. 3, No. 1, July of 2009, P. 32-42; and
Non Patent Literature 2: Suguru Kameda, Noriharu Suematsu, Fumihiro Yamagata, Hiroshi Oguma, Tadashi Takagi, Kazuo Tsubouchi, "Feasibility study on wireless access for location and short messages communication systems using a quasi-zenith satellite system," The Institute of Electronics, Information and Communication Engineers, Shingaku Giho, May of 2012, p. 35-40.

SUMMARY OF INVENTION

Technical Problem

The Non Patent Literature 1 states that the orthogonal Gold code sequences as a spread orthogonal code sequence for code division multiple access (CDMA) are orthogonal to each other with a shift of 0. When multiple terminal devices communicate with a base station via a nongeostationary satellite such as a quasi-zenith satellite in code division multiple access (CDMA) using orthogonal codes, the orthogonal codes in CDMA signals transmitted from the terminal devices should be synchronized on the nongeostationary satellite in order for the orthogonal codes transmitted from the terminal devices to be orthogonal to each other on the nongeostationary satellite.

However, the Non Patent Literature 1 and Patent Literatures 1 to 3 describe no means for synchronizing the orthogonal codes transmitted from the terminal devices on the nongeostationary satellite. Furthermore, the Non Patent Literature 2 refers to no specific means for synchronizing the orthogonal codes transmitted from the terminal devices on the nongeostationary satellite.

The present invention is invented with the view of the above situation and an exemplary objective of the present invention is to synchronize the orthogonal codes in CDMA signals transmitted from communication terminals on the communication path when multiple communication terminals access a base station in CDMA in which transmission signals are spread with orthogonal codes.

Solution to Problem

The communication system according to an exemplary aspect of the present invention comprises a base station radio-transmitting to multiple communication terminals and multiple communication terminals receiving signals transmitted from the base station and radio-transmitting to the base station. The communication terminals each comprise a time acquirer acquiring reference time information common to the multiple communication terminals, a clock generator generating a chip clock on the basis of the time information, a code generator generating orthogonal codes in time with the timing of the chip clock, a signal generator spreading transmission signals with the orthogonal codes to generate code division multiple access signals, a carrier wave generator generating a carrier wave, and a transmitter modulating the carrier wave generated by the carrier wave generator with the code division multiple access signals and transmitting the carrier wave to the base station.

Advantageous Effects of Invention

The present invention can synchronize the orthogonal codes in CDMA signals transmitted from communication terminals on the communication path in CDMA using orthogonal codes. Consequently, interference due to mutual correlation among the codes is diminished, whereby the quality of CDMA signals transmitted from the terminal devices to a base terminal is improved. Then, the return link communication capacity can be increased.

BRIEF DESCRIPTION OF DRAWINGS

FIG. 9 is a waveform chart showing the orthogonal code start times at the communication terminals according to Embodiment 1;

FIG. 10 is an illustration showing the relationship between a communication terminal and a quasi-zenith satellite;

FIG. 20 is a waveform chart showing the orthogonal code start times at the communication terminals according to Embodiment 2;

FIG. 21 is an illustration showing exemplary transmission parameters of the communication terminal according to Embodiment 2;

FIG. 29 is a flowchart showing the frequency shift compensation operation at the communication terminal according to Embodiment 3;

FIG. 31 is a functional block diagram of the communication terminal according to Embodiment 4;

DESCRIPTION OF EMBODIMENTS

Embodiments of the present invention will be described hereafter with reference to the drawings. In the figures, the same or corresponding components are referred to by the same reference numbers.

Embodiment 1

Figure 1:
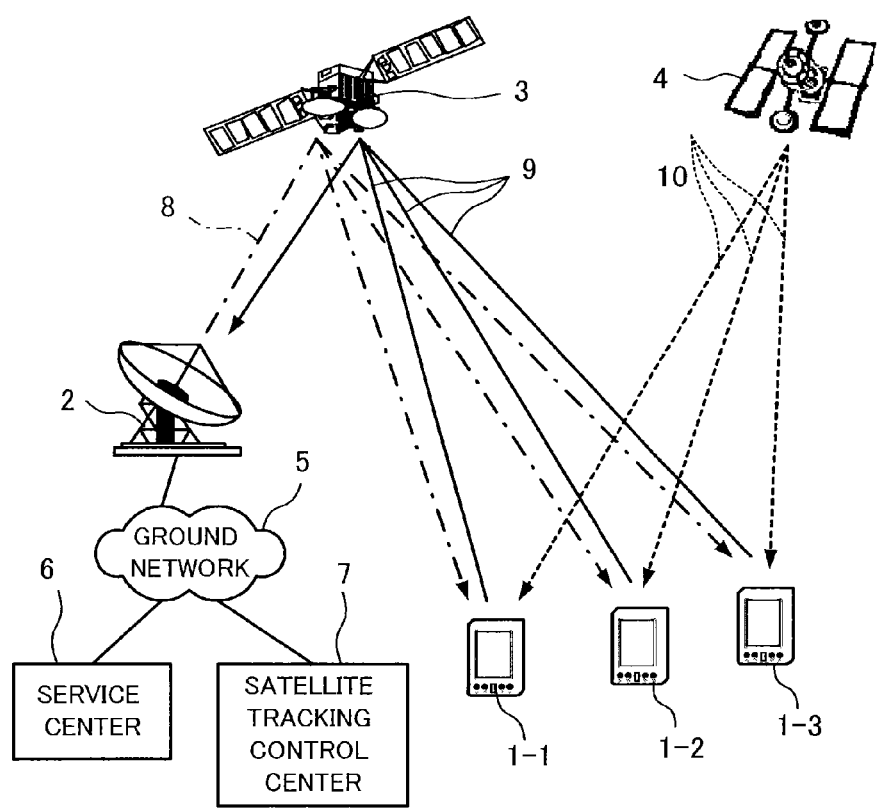
FIG. 1 is a schematic illustration showing the configuration of the communication system according to Embodiment 1 of the present invention.

FIG. 1 is a schematic illustration showing the configuration of the communication system according to Embodiment 1 of the present invention. In the communication system, a base station 2 transmits to communication terminals 1-1 to 1-3 through a forward link line 8 via a nongeostationary satellite 3 (hereafter, occasionally the satellite 3 for short). The communication terminals 1-1 to 1-3 each receive signals transmitted from the base station 2 and transmit to the base station 2 through a return link line 9 via the satellite 3. The three communication terminals 1-1 to 1-3 are given by way of example, and the number of communication terminals is not restricted to three. Any one communication terminal is referred to as a communication terminal 1-n in which n is a positive integer. Additionally, the communication terminals 1-1 to 1-n are collectively referred to as the communication terminals 1.

In Embodiment 1, multiple communication terminals 1 conduct so-called pure ALOHA random access in code division multiple access (CDMA) in which burst data CDMA-spread with orthogonal codes are transmitted toward the satellite 3.

The data transmitted from the base station 2 to the communication terminals 1 contain individual communication data or control data for each communication terminal 1-n. The data may also contain control data common to the communication terminals 1. The base station 2 is connected to a service center 6 and a satellite tracking control center 7 via a ground network 5. The service center 6 provides service by transmitting/receiving messages to/from the communication terminals 1-1 to 1-3 via the base station 2.

The "Summary" of the Non Patent Literature 2 discloses the idea of using a quasi-zenith satellite or GPS (global positioning system) satellite to transmit very short messages such as someone's safety information via a satellite (quasi-zenith satellite). Such short messages are sometimes called location short messages and, hereafter, referred to as the short messages.

Examples of service using the short messages include transfer of a rescue message, emergency message, or rescue signal transmitted upon disaster from a user terminal (portable terminal) of a disaster victim and containing location information to the service center 6 via the return link line 9. In such a service, the service center 6 transmits a return message to the received short message to the user terminal via the forward link line 8. The communication system according to this embodiment provides service of transmitting/receiving the short messages.

The satellite tracking control center 7 sends satellite orbit information of the satellite 3 and the like to the base station 2. The communication terminals 1-1 to 1-3 receive GPS signals 10 containing location information and clock time information (time information) from a GPS satellite 4, for example, in order to contain information of their own location in a rescue message. Here, the GPS satellite 4 can include a quasi-zenith satellite having the GPS positioning function.

An example of the communication system according to Embodiment 1 as shown in FIG. 1 is a quasi-zenith satellite system. Examples of the quasi-zenith satellite system include a restricted area satellite system in which three satellites go around the earth once per day on a given orbit and there is always at least one of the three satellites in the air around above Japan (at the zenith). The three satellites in the quasi-zenith satellite system are arranged so that they pass on a given orbit at equal time intervals, and the satellites are switch at eight hour intervals so as to always assure an elevation angle of 60 degrees of higher. Consequently, the user can always receive excellent mobile body communication service of which the communication line is rarely blocked by a building or the like. In this embodiment, the satellite 3 can be the one having the GPS satellite function.

The communication terminals 1 receive the GPS signals 10 transmitted from the GPS satellite 4 and acquire reference time information common to multiple communication terminals 1. The communication terminals 1 generate a chip clock on the basis of the acquired time information, and uses the chip clock as the reference for orthogonal code generation times. Then, the orthogonal codes generated on the basis of the chip clock as the reference for generation times are used to spread transmission signals to transmit to the base station 2 so as to generate CDMA signals. Then, multiple communication terminals 1 can synchronize their orthogonal code times with each other from time information.

Figure 2:
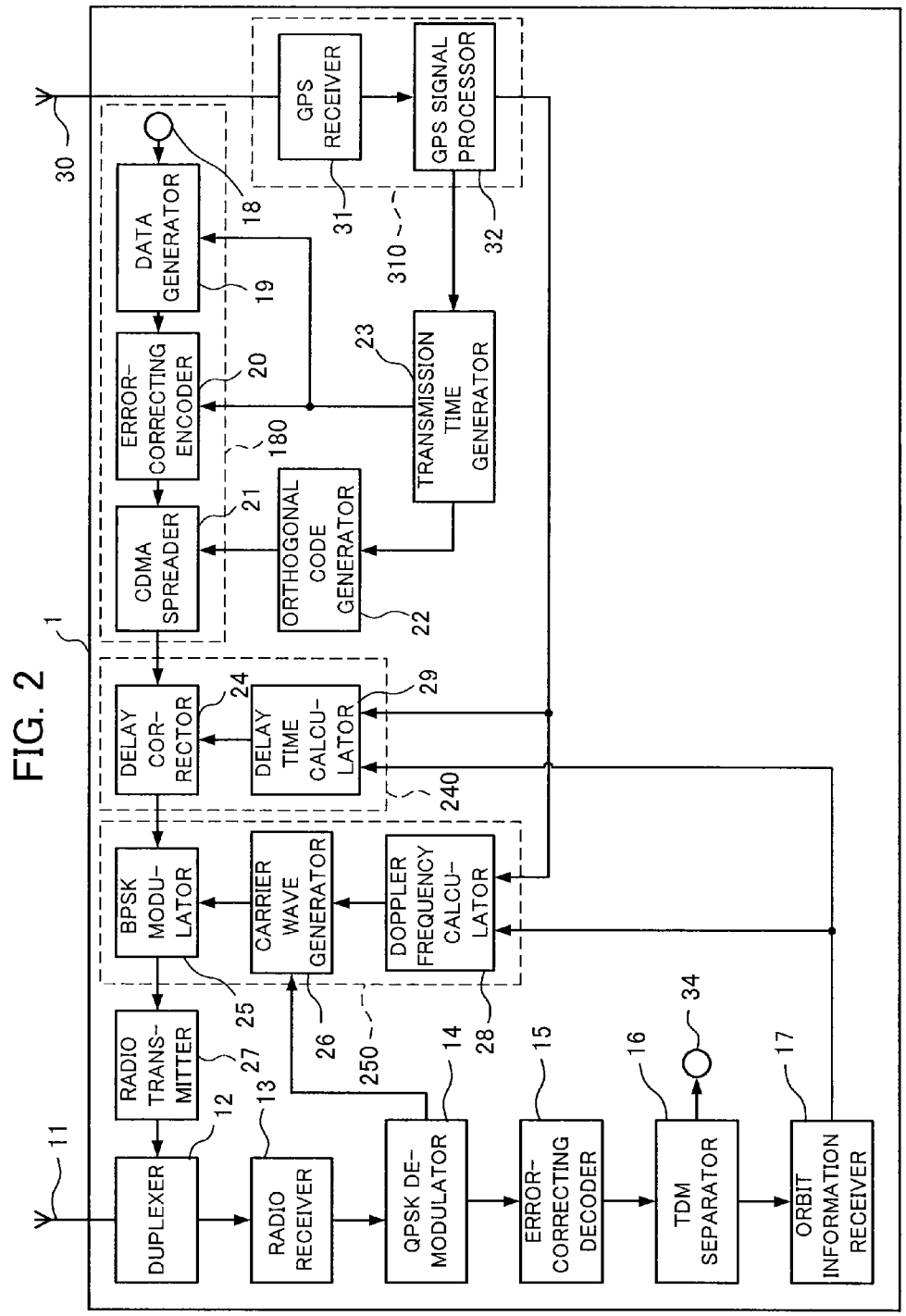
FIG. 2 is a block diagram showing an exemplary configuration of the communication terminal according to Embodiment 1.

FIG. 2 is a block diagram showing an exemplary configuration of the communication terminal according to Embodiment 1. The communication terminals 1 receive signals from the base station 2 on the forward link line 8 (the forward link signals, hereafter) with a satellite communication antenna 11 of the communication terminal 1, and separate the signals from transmission signals with a duplexer 12. The separated forward link signals are low-noise-amplified by a radio receiver 13, and QPSK (quadrature phase shift keying)-modulated waves are demodulated by a QPSK demodulator 14. The QPSK-demodulated, received data are subject to error-correcting decoding by an error-correcting decoder 15 to restore the original information data. For example, the information data of forward link signals are transmitted in TDM (time division multiplex) and the communication data or control data destined for the communication terminals 1 are time-division multiplexed. A TDM separator 16 separates the data destined for its own terminal, outputs the data to a received data output terminal 34, separates orbit information of the satellite 3 that is part of the control data, and outputs the orbit information to an orbit information receiver 17.

The communication terminals 1 acquire reference time information common to multiple communication terminals 1 with an information acquirer 310. The information acquirer 310 comprises, for example, a GPS antenna 30, a GPS receiver 31, and a GPS signal processor 32. The GPS signals 10 (see FIG. 1) from the GPS satellite 4 are received by the GPS receiver 31 via the GPS antenna 30. The GPS signals 10 are processed by the GPS signal processor 32, whereby GPS clock time signals and GPS location data are obtained.

A transmission time generator 23 generates a chip clock on the basis of the time information acquired by the information acquirer 310, and supplies the chip clock to an orthogonal code generator 22 as the reference for orthogonal code generation times.

Transmission data such as short messages transmitted by the communication terminals 1 are entered from a data input terminal 18. A data generator 19 adds synchronization bits, control bits, and the like to the transmission data entered from the data input terminal 18 to convert the transmission data to a given burst format. Then, an error-correcting encoder 20 adds error correction data to the burst format for error-correcting encoding. Furthermore, a CDMA spreader (signal generator) 21 performs modulo 2 addition of the transmission data in the error-correcting-encoded burst format and an orthogonal code sequence generated by an orthogonal code generator 22 to spread the data for CDMA. The data input terminal 18, data generator 19, error-correcting encoder 20, and CDMA spreader 21 constitute a transmission signal generator 180.

Figure 3A:
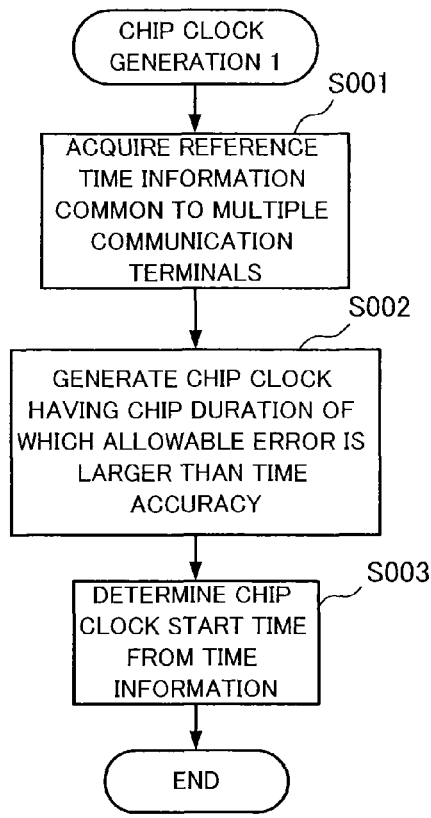
FIG. 3A is a flowchart showing an example of the chip clock generation operation according to Embodiment 1.

A transmission time generator 23 generates clock signals and timing signals synchronized with the GPS clock time signals from the GPS signal processor 32 for the components. FIG. 3A is a flowchart showing an example of the chip clock generation operation according to Embodiment 1.

As shown in FIG. 3A, the information acquirer 310 acquires reference time information common to multiple communication terminals 1 (Step S001). Then, the transmission time generator 23 generates a chip clock having a chip duration of which the allowable error is larger than the time accuracy of the acquired time information (Step S002). This matter will be described later with reference to FIG. 7.

The transmission time generator 23 determines a chip clock start time from the time information acquired (for example, from the GPS satellite 4) in the Step S001 (Step S003).

Figure 3B:
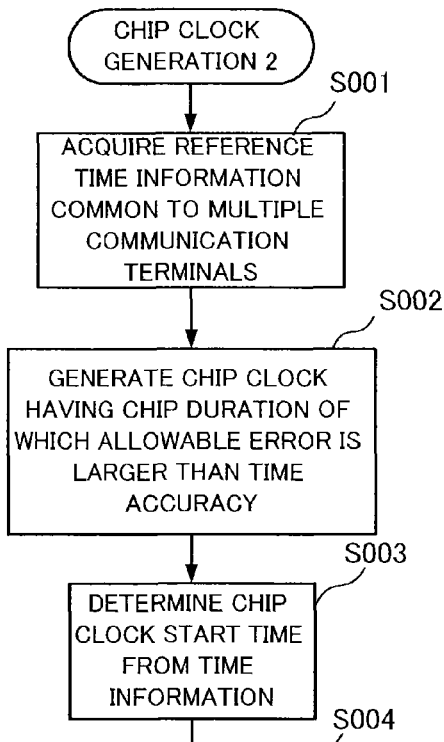
FIG. 3B is a flowchart showing an example of the chip clock generation operation according o Embodiment 1.

FIG. 3B is a flowchart showing an example of the chip clock generation operation according to Embodiment 1. In FIG. 3B, furthermore, orthogonal codes are generated on the basis of the chip clock start time generated by the chip clock generation method shown in FIG. 3A (Step S004). In other words, FIG. 3A shows up to the determination of a chip clock start time and FIG. 3B shows up to the generation of orthogonal codes based on the chip clock start time.

Figure 3C:
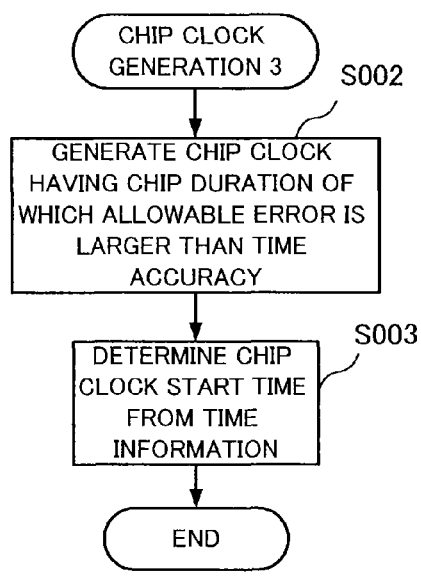
FIG. 3C is a flowchart showing an example of the chip clock generation operation according to Embodiment 1.

FIG. 3C is a flowchart showing an example of the chip clock generation operation according to Embodiment 1. The chip clock generation method can omit the step S001 of acquiring the time information as shown in FIG. 3C if the time information having a given time accuracy is retained.

A delay corrector 24 in FIG. 2 corrects the data CDMA-spread by the CDMA spreader 21 by a transfer delay time (delay time difference) corresponding to the difference between the distance from the location of the communication terminal 1 to the satellite 3 and a reference distance. In other words, the transmission time is corrected by the delay time difference among the communication terminals 1 so that the signals transmitted from the communication terminals 1 are synchronized when the signals have arrived at the satellite 3.

A delay time calculator 29 calculates a transfer delay time (delay time difference) corresponding to the difference between the distance from the location of the communication terminal 1 to the satellite 3 and a reference distance using GPS location data output from the GPS signal processor 32. The delay corrector 24 and delay time calculator 29 constitute a delay processor 240.

A BPSK modulator 25 (modulator 25), for example, BPSK-modulates the carrier wave generated by a carrier wave generator 26 with data corrected in regard to the delay time difference. A radio transmitter 27 power-amplifies the modulated signals and transmits the signals toward the satellite 3 as transmission burst signals on the return link line 9 from the satellite communication antenna 11 via the duplexer 12.

A Doppler frequency processor 250 corrects the frequency of the transmission carrier wave so that the signals on the return link line 9 (return link signals, hereafter) transmitted by the communication terminals 1 toward the satellite 3 have the same frequency when received (observed) by the satellite 3 regardless of from which communication terminal 1 the signals are transmitted. The Doppler frequency processor 250 comprises the BPSK modulator 25, carrier wave generator 26, and a Doppler frequency calculator 28.

The Doppler frequency calculator 28 calculates a Doppler frequency shift that occurs as the satellite 3 moves with respect to the communication terminal 1 and corresponds to the RF carrier wave frequency using satellite orbit information from the orbit information receiver 17 and GPS location data from the GPS signal processor 32. In other words, the Doppler frequency calculator 28 calculates the deviation in frequency due to the Doppler frequency shift of CDMA signals from change in the relative distance between the satellite 3 and communication terminal 1.

In Embodiment 1, the Doppler frequency calculator 28 calculates the Doppler frequency shift from the moving speed of the nongeostationary satellite 3 with respect to the ground surface. In Embodiment 1, it is assumed that the moving speed of the communication terminals 1 can be ignored when the moving speed of the communication terminals 1 is slower than the moving speed of the nongeostationary satellite 3.

The carrier wave generator 26 generates a carrier wave of a frequency corrected from a specified frequency by the Doppler frequency shift. The carrier wave from the carrier wave generator 26 is turned on/off in time with CDMA signals output from the CDMA spreader 21 according to the chip clock generated by the transmission time generator 23. The carrier wave is actually turned on/off either by the BPSK modulator 25 or by the carrier wave generator 26, or possibly by a switch provided between the BPSK modulator 25 and carrier wave generator 26.

Figure 4:
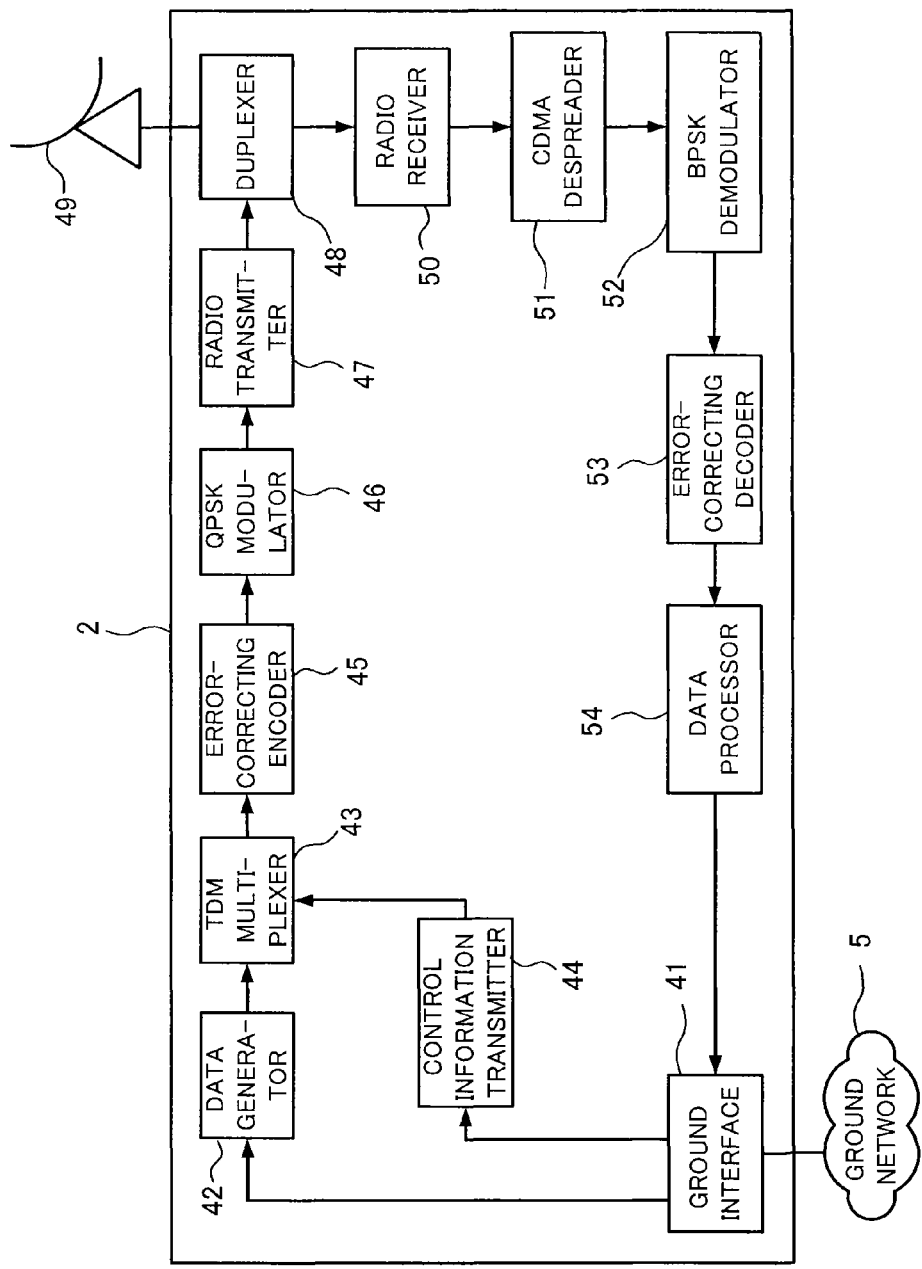
FIG. 4 is a block diagram showing an exemplary configuration of the base station according to Embodiment 1.

FIG. 4 is a block diagram showing an exemplary configuration of the base station according to Embodiment 1. The base station 2 receives data transmitted from the service center 6 to the base station 2 via the ground network 5 and destined for the communication terminals 1 with a ground interface 41. Furthermore, the ground interface 41 receives data (mainly satellite orbit information) transmitted from the satellite tracking control center 7 to the base station 2 via the ground network 5.

A data generator 42 of the base station 2 receives data to transmit to the communication terminals 1 from the ground interface 41 and generates transmission data for each of the communication terminals 1. A TDM multiplexer 43 TDM-multiplexes the transmission data along with control data (satellite orbit information and the like) transmitted from a control information transmitter 44. An error-correcting encoder 45 adds an error correction code to the TDM-multiplexed data, and error-correcting-encodes the data. A QPSK modulator 46, for example, QPSK-modulates the error-correcting-encoded data. A radio transmitter 47 converts the modulated signals to those of RF frequencies, high-power amplifies the signals, and transmits the signals toward the satellite 3 as forward link signals from a satellite communication antenna 49 via a duplexer 48.

On the other hand, signals transmitted from multiple communication terminals 1 via the satellite 3 (relay) are received by the satellite communication antenna 49, go through the duplexer 48, low-noise-amplified by a radio receiver 50, and converted to IF frequency signals. A CDMA despreader 51 captures the chip clock and orthogonal code start time from the received CDMA signals, and CDMA-despreads the chip clock and orthogonal code start time.

After a BPSK demodulator 52 of the base station 2 BPSK-demodulates the signals despread by the CDMA despreader 51, an error-correcting decoder 53 executes error-correcting decoding. A data processor 54 forms data to output to the service center 6 from the error-correcting-decoded data, and transmits the data to the ground interface 41. The ground interface 41 transmits the data to the service center 6 via the ground network 5.

Figure 5:
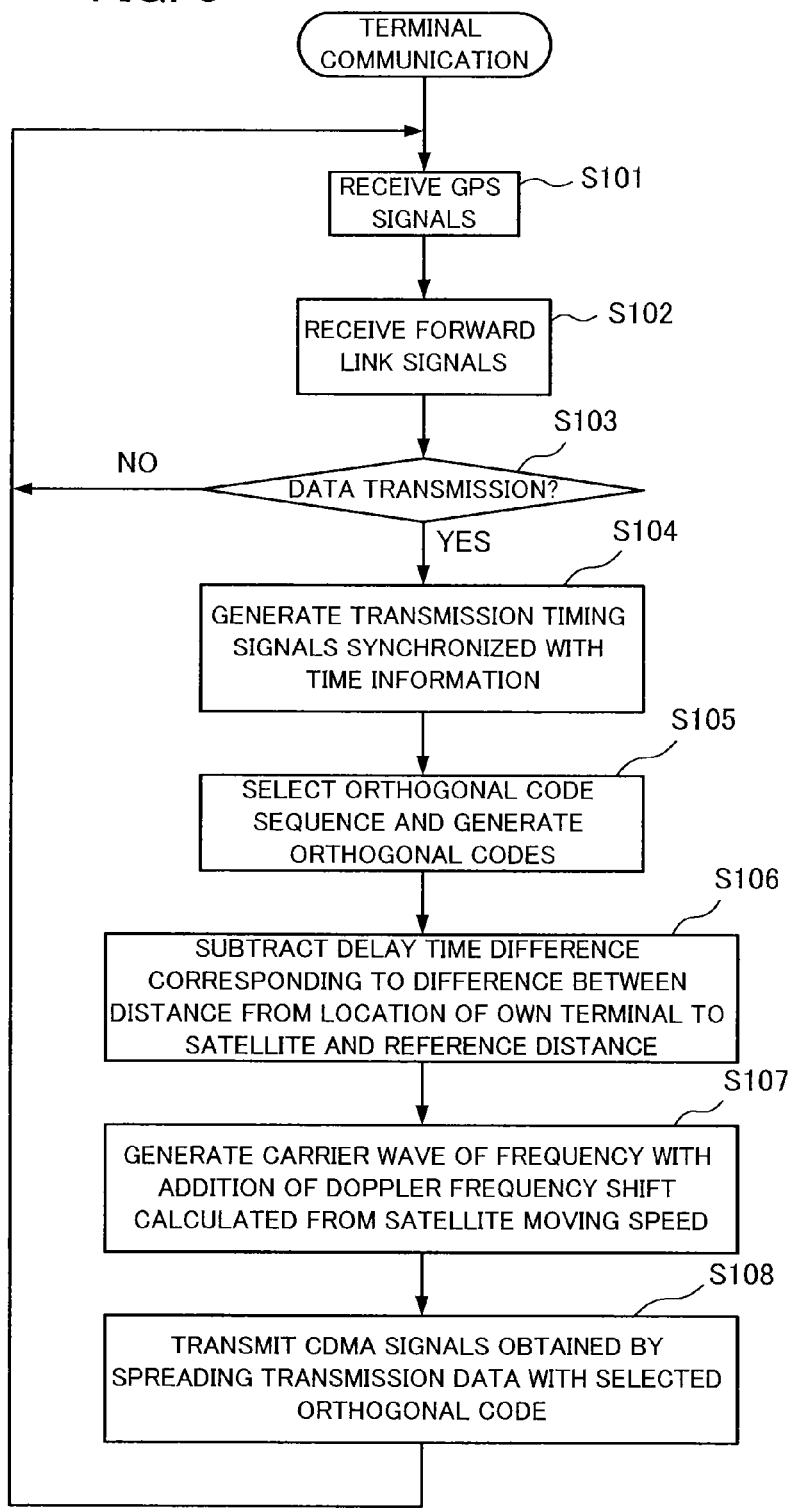
FIG. 5 is a flowchart showing an example of the communication operation of the communication terminal according to Embodiment 1.

FIG. 5 is a flowchart showing an example of the communication operation of the communication terminal according to Embodiment 1. As the communication terminal 1 is powered on, the information acquirer 310 receives the GPS signals 10 from the GPS satellite 4 (Step S101), and the radio receiver 13 receives forward link signals from the base station 2 (Step S102).

Then, the communication terminal 1 determines whether to transmit data (Step S103). For example, it is determined whether the user operates the communication terminal 1 (portable terminal) and selects data transmission. If there are no data to transmit (Step S103; NO), the communication terminal 1 returns to the Step S101 and repeatedly receives GPS signals and forward link signals. It is possible that for transmitting data, forward link signals are received prior to the transmission.

If it is determined to transmit data (Step S103; YES), the transmission time generator 23 generates transmission timing signals synchronized with the GPS clock time signals generated by the GPS signal processor 32 (Step S104). Here, the transmission timing signals are a chip clock for generating orthogonal codes, an orthogonal code start time, an error-correcting encoding clock, a data clock, and the like.

The orthogonal code generator 22 randomly selects a orthogonal code among multiple orthogonal codes, and generates the selected orthogonal code based on the chip clock and orthogonal code start time synchronized with the GPS clock time signals (Step S105). At this stage, if the distances to the satellite 3 from the communication terminals 1 are equal, the orthogonal code chip clocks and orthogonal code start times in CDMA signals transmitted by the communication terminals 1 are synchronized on the transponder of the satellite 3.

However, if the communication terminals 1 conducting satellite communication are spread in a large area (for example, throughout Japan), the distance to the satellite 3 differs depending on the geographic location of the communication terminals 1. Therefore, the delay time between the time of CDMA signal transmission at the communication terminals 1 and the time of arrival at the satellite transponder differs depending on the location of the communication terminals 1. Then, the delay time calculator 29 obtains the difference between the distance from the location of the communication terminals 1 to the satellite 3 and the distance from a reference ground point stored in a memory in advance to the satellite 3 using location data measured by the GPS signal processor 32, and calculates the delay time difference corresponding to the distance difference. Then, the delay corrector 24 subtracts the delay time difference from the time information so that the signals transmitted by the communication terminals 1 arrive the satellite 3 at the same time (Step S106). Here, the GPS location data include latitude data, longitude data, and altitude data.

If there is a difference in the carrier wave frequency of CDMA signals transmitted by the communication terminals 1, the orthogonality of orthogonal codes disappears when the return link signals are received at the satellite 3. Accordingly, the Doppler frequency calculator 28 calculates the Doppler frequency shift due to movement of the nongeostationary satellite 3 in accordance with the location of the communication terminals 1. Then, the carrier wave generator 26 generates a carrier wave of a frequency with the addition of the Doppler frequency shift (Step S107). The radio transmitter 27 spreads the transmission data with orthogonal codes generated by the orthogonal code generator 22 based on the chip clock and orthogonal code start time synchronized with the GPS clock time signals, and transmits the data toward the satellite 3 as CDMA signals (Step S108).

Figure 6:
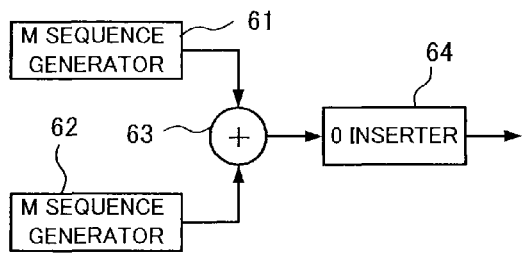
FIG. 6 is a block diagram showing the configuration of the orthogonal code generator according to Embodiment 1.

FIG. 6 is a block diagram showing the configuration of the orthogonal code generator according to Embodiment 1. For conducting code division multiple access (CDMA), it is desired that a large number of code sequences can be generated and the generate code sequences have a low mutual correlation value. For example, orthogonal Gold codes satisfy the above conditions. FIG. 6 explains, for example, an orthogonal Gold code generation circuit described in the Non Patent Literature 1. However, the orthogonal codes are not restricted to the orthogonal Gold codes, and can be those obtained by spreading Walsh codes with a PN sequence (pseudorandom noise sequence), which are often used in cell-phone systems.

In FIG. 6, an M sequence (cycle; N−1) generated by an M sequence generator 61 and an M sequence (cycle; N−1) generated by an M sequence generator 62 form a preferred pair, and generate a Gold code sequence (cycle; N−1) at the output of a modulo 2 adder 63. Here, N is the number of chips in one bit duration. A 0 inserter 64 showed in FIG. 6 adds 0 at the end of a Gold code sequence generated in each cycle of N−1. Consequently, the output of the 0 inserter 64 is an orthogonal Gold code sequence of a cycle of N. Furthermore, the number of orthogonal Gold code sequences generated from a given preferred pair is equal to the length of the sequence, whereby N orthogonal Gold code sequences can be generated.

The sequences generated as described above are orthogonal to each other with a shift of 0, namely with a phase difference of 0, whereby the mutual correlation value can be diminished to 0. Therefore, in the case of conducting code division multiple access (CDMA) using orthogonal codes in satellite communication, in order for the CDMA signals spread with orthogonal codes transmitted by the communication terminals 1 to be orthogonal to each other on the satellite transponder, the transmission times of the communication terminals 1 should be controlled and synchronized so that the phase difference among the orthogonal codes transmitted from the communication terminals 1 are as small as possible within a chip duration on the satellite transponder.

For that reason, like the method shown in the Patent Literature 2, a method of controlling the transmission times of the communication terminals 1 from the base station 2 is contemplated. However, as the number of accessing communication terminals 1 is increased, an enormous number of control bits are exchanged between the base station 2 and communication terminals 1, increasing the volume of processing at the base station 2, deteriorating the efficiency of use of the frequencies, delaying the control, and/or causing congestion. Then, in order to synchronize the transmission times of the communication terminals 1, Embodiment 1 uses the chip clock generation method (and orthogonal code generation method) described with reference to FIGS. 3A to 3C. In the communication terminal 1 (communication system) according to Embodiment 1, it is assumed that GPS clock time signals output from the GPS signal processor 32 are used.

Figure 7:
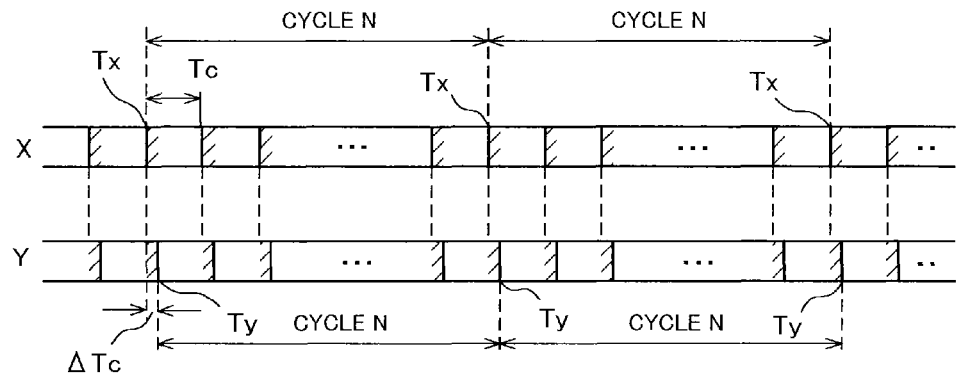
FIG. 7 is a chart showing the phase difference at the communication terminal according to Embodiment 1.

To what extent the phase difference within a chip duration among orthogonal codes should be reduced will be discussed hereafter. FIG. 7 is a chart showing the phase difference at the communication terminal 1 according to Embodiment 1. Here, it is assumed that two CDMA signals with orthogonal codes, a desired signal X and an interference signal Y, have arrived at (accessed) the satellite 3. The chip duration of the orthogonal codes in the two signals is defined as Tc, and the phase difference within a chip duration between the orthogonal codes in the two signals is defined as $\Delta Tc$. The start time Tx of the desired signal X and the start time Ty of the interference signal Y are shifted by a phase difference $\Delta Tc$. However, $\Delta Tc$ is within the range presented by the following expression (1):

$$0 \leq (\Delta Tc/Tc) \leq 1 \qquad (1)$$

Assuming that a cycle of orthogonal codes comprises N chips, and regarding the self-correlation value for a cycle of orthogonal codes of the desired signal as the signal component, the signal component (Signal) of the desired signal is presented by the following expression (2):

$$\text{Signal} = N \quad (2)$$

Then, the mutual correlation value between the desired signal orthogonal code and interference signal orthogonal code will be discussed. As shown in FIG. 7, the mutual correlation between the two orthogonal code sequences is divided into two portions. In other words, the mutual correlation value is the same as the correlation value of orthogonal code sequences that are in phase, and uncorrelated, namely the mutual correlation value is 0 in the portions where the two overlap, such as the portions other than the hatched portions in FIG. 7.

On the other hand, a phase difference within a chip duration occurs in the hatched portions, and such portions are correlated to an adjoining code chip. The mutual correlation value is random and can be considered to be a noise component for the desired signal component. The quantity of the noise component (Noise) is presented by the following expression (3):

$$\text{Noise} = \sqrt{(N \cdot \Delta Tc/Tc)} \quad (3)$$

Therefore, the signal-to-noise ratio of the desired signal is presented by the expression (4):

[Math 1]

$$\frac{\text{Signal}}{\text{Noise}} (\text{dB}) = 20 * \log\left(\frac{N}{\sqrt{N * \frac{\Delta Tc}{Tc}}}\right) = 20 * \log \frac{N}{\sqrt{N}} + 20 * \log \sqrt{\frac{Tc}{\Delta Tc}} \quad (4)$$

In the expression (4), 20*log(N/√N) can be considered to be the S/N ratio due to mutual correlation interference between spreading codes in conventional CDMA that does not use orthogonal codes. Furthermore, 20*log(√(Tc/ΔTc)) can be considered to be the degree of improvement in the S/N ratio, in other words the figure of merit, when orthogonal codes are used in CDMA and the technique of synchronizing the orthogonal codes in CDMA signals with a phase difference within a chip duration on the satellite 3 in this embodiment is used. For example, the degree of improvement is 10 dB when ΔTc/Tc=1/10 chip.

In the expression (4), assuming the cycle N=1024 and ΔTc/Tc=1/10 chip, the expression (4) has the value as presented by the expression (5), and the signal-to-noise ratio of the desired signal is 40 dB:

$$(\text{Signal/Noise}) (\text{dB}) = 30 (\text{dB}) + 10 (\text{dB}) = 40 (\text{dB}) \quad (5)$$

In the case of ΔTc/Tc=1/10 chip, it is assumed that 150 communication terminals 1 simultaneously access and the desired signal receives from all other signals an amount of interference due to the same mutual correlation. Since the above signal-to-noise ratio deteriorates by 10×log(149)≈22 dB, the signal-to-noise ratio of the desired signal is approximately 18 dB. This value is sufficiently higher than the signal-to-noise ratio (several dB) normally required for satellite communication.

Furthermore, for example, if ΔTc/Tc=1/100 chip, in the same manner as the above case, the signal-to-noise ratio of the desired signal is 50 dB. When ΔTc/Tc=1/100 chip, the above signal-to-noise ratio deteriorates by approximately 30 dB, and the signal-to-noise ratio of the desired signal is approximately 20 dB even if there are 1024 simultaneously accessing terminals, namely as many as the number of orthogonal code sequences for a cycle of 1024. However, the above case is the worst case in which with respect to one desired signal, all other interference signals are shifted by 1/10 chip or 1/100 chip and the desired signal receives interference from all other interference signals. In practice, presumably, a better signal-to-noise ratio can be obtained. Thus, as described above, it is sufficient to have a chip clock having a chip duration of which the allowable error is larger than the time accuracy of the acquired time information.

The following explanation will be made using specific system parameters by way of example. Generally, the information rate of the return link line 9 in satellite communication is restricted by the transmission power of the communication terminals 1. For example, if the communication terminals 1 are of a cell-phone size, message communication at an information rate of around 50 bps is presumably available. It is assumed to use an error correction code of an encoding rate of 1/2 and spread with orthogonal codes of a code sequence length of 1024 chips. The orthogonal code chip rate is 50×2× 1024=102.4 kcps, and the chip duration is approximately 10 μsec. The clock time accuracy of GPS clock time signals can be 0.1 μsec to 1 μsec; therefore, synchronization in which the ΔTc/Tc of transmission signals of the communication terminals 1 is within 1/100 chip to 1/10 chip is available.

The communication system (communication terminal and communication method) according to Embodiment 1 is particularly useful for CDMA using orthogonal codes of a low chip rate. In other words, the communication system is useful for CDMA using orthogonal codes having a chip rate at which the chip duration is sufficiently longer than the GPS clock time accuracy. This is, in other words, a chip clock having a chip duration of which the allowable error is longer than the time accuracy (clock time accuracy).

Exemplary applications to which the above CDMA using orthogonal codes of a low chip rate include the above-mentioned rescue message service by short messages via a quasi-zenith satellite. Since the minimum information necessary for a rescue message is the ID of a victim (the owner of a communication terminal 1) and location information, a small number of information bits are required and the information rate of the massage can be low. Therefore, the chip rate of orthogonal codes can also be low.

Furthermore, a large number of victims almost simultaneously transmit rescue messages when a large scale of disaster occurs. In order to assure a line capacity as large as possible, it is necessary to reduce the mutual correlation interference between codes in CDMA. The technique of synchronizing the orthogonal codes of the communication terminals 1 within a chip duration according to the present invention is useful for the above situation. More specifically, in the communication terminal (communication system) according to Embodiment 1, an information acquirer 310 acquires time information having a given time accuracy, and the transmission time generator 23 generates a chip clock having a chip duration of which the allowable error is longer than the time accuracy (clock time accuracy).

Figure 8:
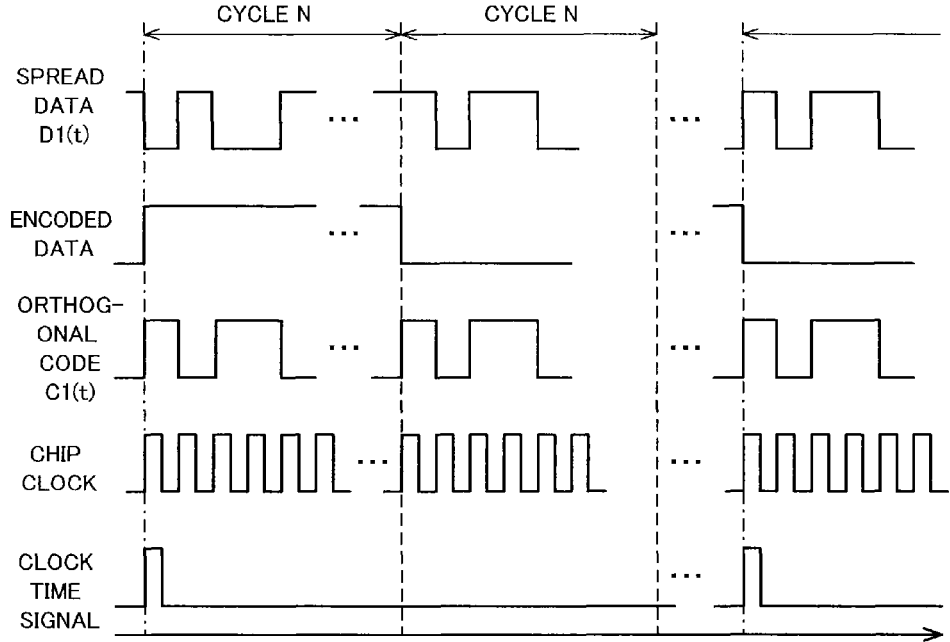
FIG. 8 is a chart showing the waveforms at the components of the communication terminal according to Embodiment 1.

FIG. 8 is a chart showing the waveforms at the components of the communication terminal according to Embodiment 1. FIG. 8 shows that the waveforms at the components of the transmission circuit of the communication terminal 1 are synchronized with GPS clock time signals (second signals, 1 PPS). In FIG. 8, the clock time signal presents the output waveform of the GPS signal processor 32, the orthogonal code and chip clock present the output waveform of the orthogonal code generator 22, the encoded data present the output waveform of the error-correcting encoder 20, and the spread data present the output waveform of the CDMA spreader 21. Furthermore, one cycle of an orthogonal code C1 (t) (N chips) and the error-correcting encoded data D1 (t) are synchronized and form spread data after modulo 2 addition.

FIG. 9 is a waveform chart showing the orthogonal code start times at the communication terminals according to Embodiment 1. FIG. 9 shows the output of the orthogonal code generator 22 of the communication terminals 1-1 and 1-2 shown in FIG. 2, in which the orthogonal code start times of orthogonal codes A and B transmitted by the communication terminals 1-1 and 1-2, respectively, are synchronized with GPS clock time signals at the chip clock level. However, in FIG. 9, it is assumed that there is no phase difference between orthogonal codes due to the clock time accuracy of GPS clock time signals. The circuit is configured so that the delay time of the transmission circuit of the CDMA spreader 21 and subsequent components is equal in the two communication terminals 1. When the two communication terminals 1 are located close and there is no difference in the distance to the satellite transponder between the two communication terminals 1, the relationship in time between the orthogonal codes A and B shown in FIG. 8 is maintained on the satellite transponder, and the mutual correlation value between the orthogonal codes A and B is 0. The transfer delay correction procedure will be described hereafter.

FIG. 10 is an illustration showing the relationship between a communication terminal and a quasi-zenith satellite. In FIG. 10, for easier understanding, it is assumed that a quasi-zenith satellite S (a nongeostationary satellite 3) is a km directly above a reference ground point P. It is further assumed that a communication terminal 1 is located at a point Q that is d km away from the point P, the distance to the quasi-zenith satellite S is b km, the radius of the earth is r km, and the angle made by the points P and Q when seen from the center O of the earth is θ rad. Then, the following expression (6) is established from the cosine rule:

$$b2=(a+r)2+r2-2(a+r)r \cos \theta \quad (6)$$

The radius r of the earth is sufficiently larger than the distance between the points P and Q; therefore, the following expression (7) is established. Thus, the expression (6) is rewritten to the expression (8).

$$\theta=d/r \quad (7)$$

$$b-a=\sqrt{((a+r)2+r2-2(a+r)r \cos(d/r))}-a \quad (8)$$

Assuming that a=39,000 km, r=6400 km, and, for example, d=30 km, the delay time difference τ=(b−a)/c=0.27 μsec in which the light speed c=300,000 km/sec. On the other hand, when d=200 km, τ=(b−a)/c=12.1 μsec.

When the above-stated system parameters are used, the chip rate of orthogonal codes is approximately 100 kcps and then the chip duration is approximately 10 μsec. It is assumed that a communication terminal 1 located at the point P and a communication terminal 1 located at the point Q in FIG. 10 simultaneously transmit CDMA signals using orthogonal codes toward the satellite 3. When d=30 km, the delay time difference to the satellite 3 between the two communication terminals 1 is 2.7/100 chip based on the above results, which is significantly small and negligible. However, when d=200 km, the delay time difference to the satellite 3 is 1.21 chip, which is larger than a chip interval and the orthogonality among orthogonal codes cannot be assured on the satellite transponder. Therefore, the communication terminals 1 have to compensate the delay time difference to the satellite 3 in accordance with the location of the communication terminals 1 themselves. Details of such a procedure will be described hereafter using the communication terminal 1 according to Embodiment 1.

Figure 11:
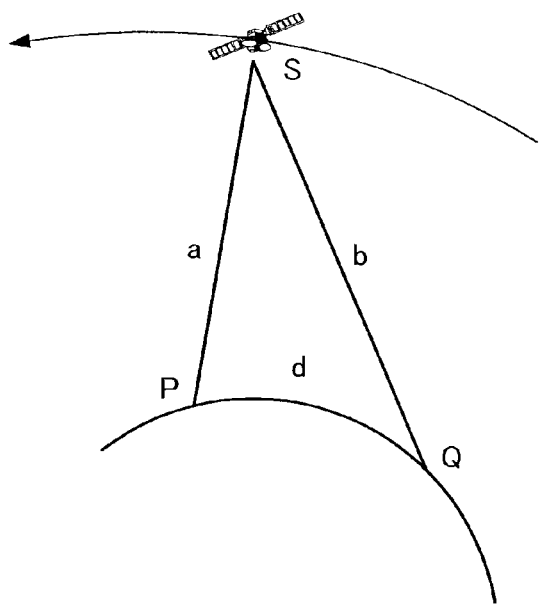
FIG. 11 is an illustration showing the relationship between a communication terminal and a nongeostationary satellite.

FIG. 11 is an illustration showing the relationship between a communication terminal and a nongeostationary satellite. It is assumed that a nongeostationary satellite S is constantly moving on a satellite orbit with respect to the ground surface, the latest position of which can be predicted by latest satellite orbit information that is downloaded from the base station 2. Here, the satellite orbit information means parameters presenting the orbit of an artificial satellite, including artificial satellite orbit elements such as the epoch, average movement, eccentricity, orbit inclination, right ascension of the northbound node, elongation of the perigee, and average anomaly.

Figure 12:
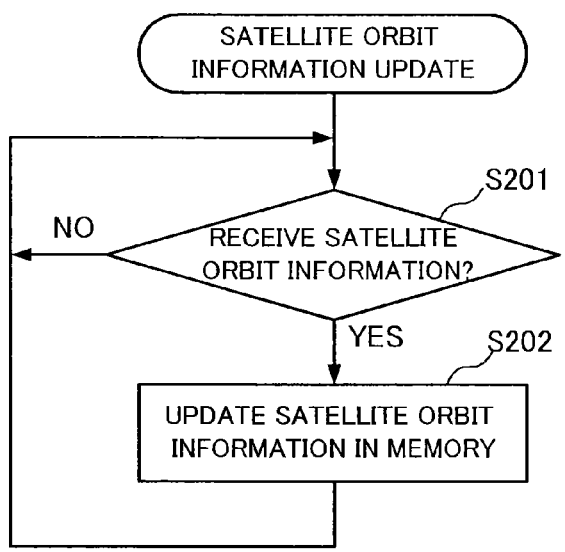
FIG. 12 is a flowchart showing the satellite orbit information update operation at the communication terminal according to Embodiment 1.
Figure 13:
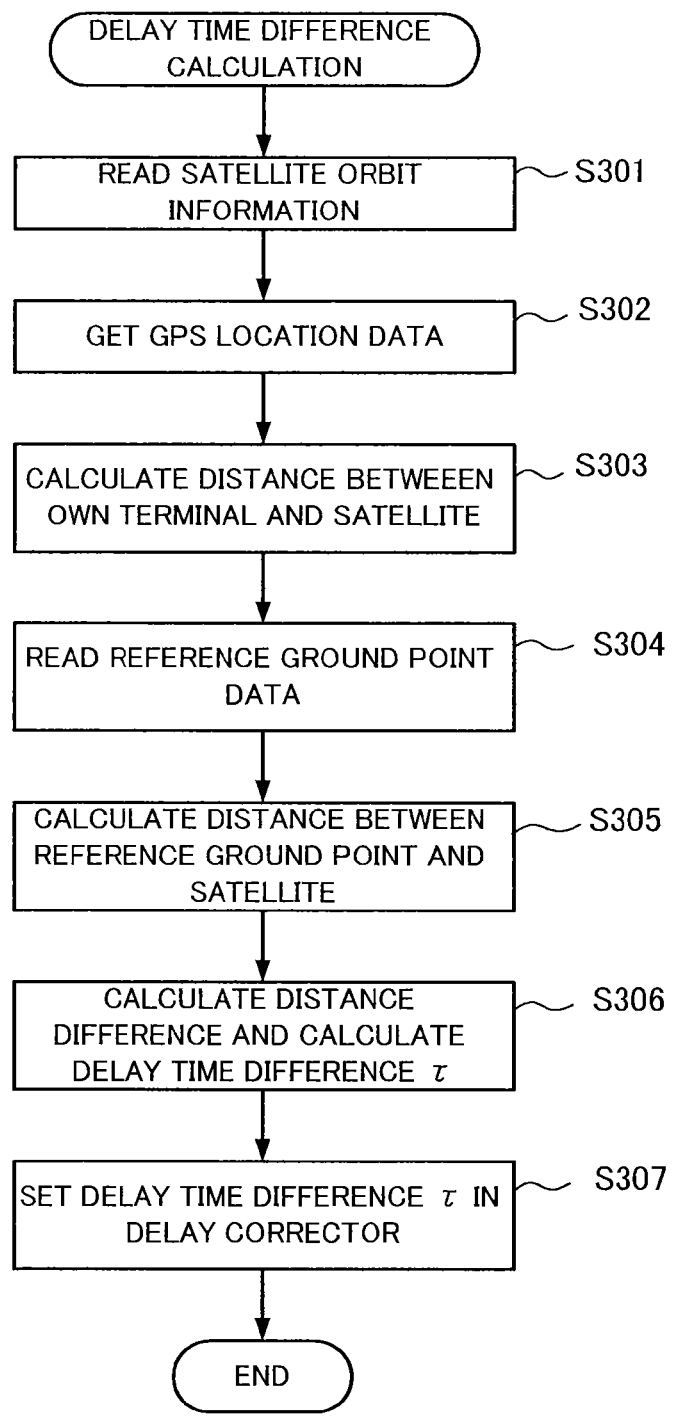
FIG. 13 is a flowchart showing the delay time difference calculation operation according to Embodiment 1.

The orbit information receiver 17 of the communication terminals 1 receives the latest satellite orbit information from the base station 2 as shown in FIG. 12 (Step S201), and then constantly updates the satellite orbit information in a not-shown memory (Step S202). The delay time calculator 29 of the communication terminals 1 reads the satellite orbit information in the memory as shown in FIG. 13 (Step S301). Here, the orbit information of the nongeostationary satellite 3 is downloaded to the communication terminals 1 from the base station 2 via the forward link line 8 and used as the latest orbit information. Default orbit information stored in a memory in advance can be used.

For simplifying the calculation, using the fact that the quasi-zenith satellite is always situated near the zenith instead of the satellite orbit information, as shown in FIG. 10, the satellite position can be approximate to be at a fixed altitude in the air in the direction of the zenith above a reference ground point. In such a case, the delay time difference to the satellite between the reference ground point and the location of the own terminal can be calculated using the above expression (8).

When the nongeostationary satellite 3 is a quasi-zenith satellite and the quasi-zenith satellite is provided with the GPS satellite function, the satellite orbit information can be obtained from GPS signals transmitted by the quasi-zenith satellite. In such a case, it can be said that the orbit information receiver 17 has the function of the information acquirer 310. More specifically, the GPS antenna 30 and GPS receiver 31 constituting the information acquirer 310 correspond to the satellite communication antenna 11 and radio receiver 13, respectively and therefore it can be said that the orbit information receiver 17 has the function of the GPS signal processor 32.

Then, the delay time calculator 29 gets GPS location data (latitude, longitude and altitude) of its own communication terminal 1 from the GPS signal processor 32 (Step S302). Subsequently, the delay time calculator 29 calculates a distance b between its own communication terminal 1 and the satellite 3 from the satellite orbit information and GPS location data (Step S303). Then, the delay time calculator 29 reads reference ground point data stored in a memory (Step S304). Furthermore, the delay time calculator 29 calculates a distance a between the reference ground point and the satellite 3 from the satellite orbit information and reference ground point data (Step S305).

The delay time calculator 29 calculates the distance difference b−a and divides the distance difference by the light speed c to calculate the delay time difference τ (Step S306), and sets the delay time difference τ in the delay corrector 24 (Step S307). Here, if the distance b between the own communication terminal 1 and satellite 3 is smaller than the distance a between the reference point and satellite 3, the sign of τ is negative (in other words, the signals are delayed from the GPS clock time signals by the absolute value of τ).

On the other hand, if the distance between the own communication terminal 1 and satellite 3 is larger than the distance between the reference ground point and satellite 3, the sign of τ is positive (in other words, the signals are advanced from the GPS clock time signals by the absolute value of τ). However, since the orbit information of the nongeostationary satellite 3, distance a between the reference ground point and nongeostationary satellite 3, and distance b between the own communication terminal 1 and nongeostationary satellite 3 are all functions of the time, the delay time difference τ is also a function of the time and then it is necessary to predict τ for the time when the communication terminal 1 transmits CDMA signals to the satellite 3 and set the r in the delay corrector 24.

In the above explanation, the case in which the delay time difference τ is positive (in other words, the signals are advanced from the GPS clock time signals by the absolute value of τ) is also taken into account. In such a case, the control becomes complex. Therefore, the reference ground point is selected so that the distance difference b−a is always zero or negative and the sine of τ is always negative (in other words, the signals are delayed from the GPS clock time signals by the absolute value of τ). In this way, the control for setting the delay time can be simplified.

Furthermore, in regard to the calculation of the distance difference b−a, the distance a between the reference ground point and nongeostationary satellite 3 can be a fixed default value. In this way, the calculation is simplified. Furthermore, when the nongeostationary satellite 3 is a quasi-zenith satellite and the quasi-zenith satellite is provided with the GPS satellite function, the distance between the own communication terminal 1 and nongeostationary satellite 3 is calculated while the GPS location data of the own communication terminal 1 is calculated from the GPS signals transmitted by the quasi-zenith satellite. Therefore, this value can be used as the distance b between the own communication terminal 1 and nongeostationary satellite 3. In this way, the calculation is simplified.

As described above, the communication terminals 1 adjust the delay time of CDMA signals transmitted by their own communication terminals 1 with respect to the GPS clock time signals, whereby the orthogonal codes in CDMA signals transmitted by the communication terminals 1 are synchronized on the transponder of the satellite 3 with a phase difference within a chip duration. The communication terminals 1 comprise the transmission time generator 23 generating transmission times for synchronizing the transmission times of transmission signals to transmit to the satellite 3 among multiple communication terminals 1-n, the transmission signal generator 180 generating transmission signals, and the delay processor 240 correcting the delay caused by the distance between the communication terminal 1 and satellite 3 upon transmission of the transmission signals generated by the transmission signal generator 180 to the satellite 3 at the transmission times. It can be said that the multiple communication terminals 1-n each correct the delay of transmission signals due to the distance to the satellite 3.

The Doppler frequency shift correction procedure will be described in detail hereafter. First, adverse effect of deviation in the carrier wave frequency of CDMA signals the base station 2 (nongeostationary satellite 3) receives from the communication terminals 1 on the mutual correlation among orthogonal codes will be discussed. Here, it is assumed that the modulated wave BPSK-modulated with an orthogonal code C1 (t) and transmitted by a communication terminal 1-1 is presented by the following expression (9):

$$AC1(t)\cos(2\pi f_1 t + \theta_1) \quad (9)$$

Similarly, it is assumed that the modulated wave BPSK-modulated with an orthogonal code C2 (t) and transmitted by another communication terminal 1-2 is presented by the following expression (10):

$$BC2(t)\cos(2\pi f_2 t + \theta_2) \quad (10)$$

Here, A and B are the amplitude of the carrier wave, f1 and f2 are the frequency of the carrier wave, and θ1 and θ2 are the phase of the carrier wave. However, for simplification, it is assumed that there is no data modulation. On the satellite transponder, the above two signals are added and presented by the following expression (11):

$$AC1(t)\cos(2\pi f_1 t + \theta_1) + BC2(t)\cos(2\pi f_2 t + \theta_2) \quad (11)$$

For demodulating the signals from the communication terminal 1-1 in CDMA despreading/demodulation at the base station 2, the expression (11) is multiplied by the following expression (12) to obtain the correlation:

$$C1(t)\cos(2\pi f_1 t + \theta_1) \quad (12)$$

The obtained correlation is presented by the following expression (13).

[Math 2]

$$\int_0^T [AC_1(t)\cos(2\pi f_3 t + \theta_1) + BC_2(t)\cos(2\pi f_2 t + \theta_2)] * \quad (13)$$

$$C_1(t)\cos(2\pi f_1 t + \theta_1)dt =$$

$$\frac{1}{2}\int_0^T C_1^2(t)dt + \frac{1}{2}\int_0^T C_1(t) * C_2(t) * \cos[2\pi(f_1 - f_2)t + (\theta_1 - \theta_2)]dt$$

In the expression (13), T is a time to obtain the correlation and an integer multiple of the orthogonal code cycle. Furthermore, for simplified explanation, it is assumed that A=B=1 and the harmonic components are filtered out and ignored. Of the expression (13), the first term refers to the desired signal and the second term refers to the intercode interference component. When f1=f2, in other words when there is no deviation in the frequency of both carrier waves, the second term of the expression (13) is 0 because C1 (t) and C2 (t) are orthogonal codes. However, when f1≠f2, the second term of the expression (13) is not 0 and some interference component due to mutual interference remains. Therefore, it is necessary to reduce the carrier wave frequency deviation of CDMA signals received from the communication terminals 1 so as to diminish the mutual correlation among orthogonal codes.

Generally, in satellite communication, a terminal receives from a base station forward signals of which the local frequency deviation at the satellite transponder is compensated at the base station, and generates a carrier wave frequency of return link signals of its own terminal on the basis of the received carrier wave frequency of the forward signals. Thus, the carrier wave frequency deviation of return link signals transmitted by the terminal is diminished.

In the case of a nongeostationary satellite, the nongeostationary satellite moves relatively to the base station and therefore a Doppler frequency shift occurs in the carrier wave of forward link signals. Since this frequency shift is common to the terminals, the Doppler frequency shift in the carrier wave of forward link signals due to relative movement of the nongeostationary satellite to the base station can be compensated at the base station. The compensation of the carrier wave frequency of forward link signals at the base station can be accomplished by sending and turning back a pilot signal to the satellite. The method is described in detail in the Patent Literature 3.

However, the Doppler frequency shift of forward link signals due to relative movement between the nongeostationary satellite and terminal and the Doppler frequency shift of return link signals due to relative movement between the nongeostationary satellite and terminal differ in magnitude depending on the location of the terminal, and therefore are not compensated at the base station.

Then, in this Embodiment 1, in order to reduce the carrier wave frequency deviation of CDMA signals the satellite 3 receives from the communication terminals 1 and then diminish the mutual correlation among orthogonal codes, the communication terminals 1 utilize a method of compensating the carrier wave Doppler frequency shift between the nongeostationary satellite 3 and communication terminals 1 due to movement of the nongeostationary satellite 3 based on the location of the communication terminals 1. Consequently, the return link signals transmitted by the communication terminals 1 will be subject to smaller carrier wave frequency deviation among the communication terminals 1. Here, in this Embodiment 1, it is assumed that the communication terminals 1 are not moving or moving at a speed much slower than the nongeostationary satellite 3, and thus the carrier wave Doppler frequency shift with respect to the nongeostationary satellite 3 due to movement of the communication terminals 1 can be ignored.

Figure 14:
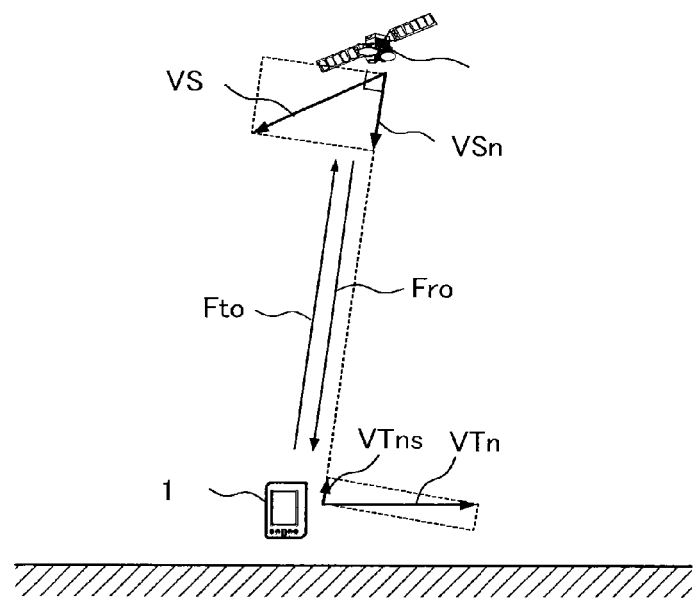
FIG. 14 is a schematic illustration showing the Doppler frequency shift derivation according to Embodiment 1.

FIG. 14 is a schematic illustration showing the Doppler frequency shift derivation according to Embodiment 1. Here, it is assumed that a communication terminal 1-$n$ is present at a geographic point Pn. Here, it is assumed that the communication terminal 1-$n$ is still on the ground surface and the moving speed VTn of the communication terminal 1 is 0.

It is assumed that the carrier wave frequency of forward link signals received by the communication terminal 1-$n$ is Frn and the light speed is C. It is further assumed that the central frequency of the forward link signal carrier wave frequency transmitted by the satellite 3 is Fro. However, as described above, since the local frequency deviation at the satellite and the Doppler frequency shift due to relative movement of the nongeostationary satellite to the base station 2 are compensated at the base station 2, the above Fro does not contain the frequency deviation due to those factors. From FIG. 14, the Doppler frequency shift ΔFro1 corresponding to the received carrier wave in the direction of the communication terminal 1 due to movement of the satellite is presented by the following expression (14):

$$\Delta Fro1 = Fro \cdot VSn/C \quad (14)$$

Here, it is assumed that ΔFro1 is positive when the satellite 3 and communication terminal 1 come closer to each other.

Therefore, the carrier wave frequency Frn of forward link signals received by the communication terminal 1-$n$ is presented by the following expression (15):

$$Frn = Fro + \Delta Fro1 \quad (15)$$

Figure 15:
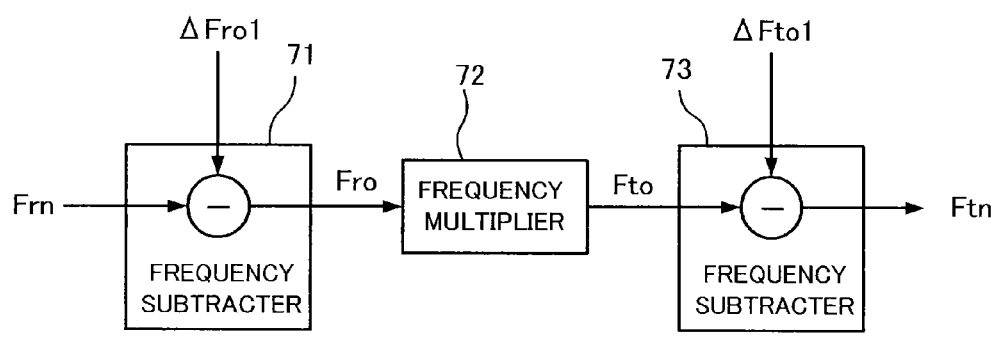
FIG. 15 is a block diagram showing the frequency subtracters and frequency multiplier at the communication terminal according to Embodiment 1.

FIG. 15 is a block diagram showing the frequency subtracters and frequency multiplier at the communication terminal according to Embodiment 1. The communication terminal 1-$n$ obtains a relative moving speed VSn of the nongeostationary satellite 3 with respect to the communication terminal 1 from orbit information of the nongeostationary satellite 3 and GPS location data of the communication terminal 1. Then, the communication terminal 1-$n$ calculates the Doppler frequency shift ΔFro1 corresponding to the received carrier wave central frequency from the above expression (14). Subsequently, a frequency subtracter 71 of the communication terminal 1-$n$ generates Fro by the following expression (16) on the basis of the carrier wave frequency Frn of the received forward link signals:

$$Fro = Frn - \Delta Fro1 \quad (16)$$

In other words, the Doppler frequency shift ΔFro1 corresponding to the received carrier wave central frequency is compensated. Assuming that the ratio of the carrier wave central frequency Fro of forward link signals to the carrier wave central frequency Fto of transmission return link signals is Rrt, a frequency multiplier 72 can generate Fto by the following expression (17):

$$Fto = Fro \cdot Rrt \quad (17)$$

in which Rrt is a preset value.

Then, the Doppler frequency shift ΔFto1 corresponding to the transmission carrier wave central frequency is calculated from FIG. 14 (Expression (18)). Here, it is assumed that ΔFto1 is positive when the satellite 3 and communication terminal 1 come closer to each other:

$$\Delta Fto1 = Fto \cdot VSn/C \quad (18)$$

Furthermore, a frequency subtracter 73 obtains Ftn by the following expression (19) to compensate the Doppler frequency shift ΔFto1 corresponding to the transmission carrier wave central frequency:

$$Ftn = Fto - \Delta Fto1 \quad (19)$$

In other words, when the communication terminal 1-$n$ transmits return link signals having a carrier wave frequency Ftn given by the expression (19), the return link signals are subject to the Doppler frequency shift according to the location of the communication terminal 1-$n$ due to movement of the nongeostationary satellite 3 upon reception at the satellite transponder, whereby the carrier wave frequency Ftn' of the return link signals received on the satellite transponder from the communication terminal 1-$n$ is presented by the following expression (20)

$$Ftn' = Ftn \cdot (1 + VSn/C) \quad (20)$$
$$= (Fto - \Delta Fto1) \cdot (1 + VSn/C) \approx Fto$$

in which ΔFto1·VSn/C≈0.

Consequently, the carrier wave frequency deviation among return link signals transmitted by the communication terminals 1 is nearly 0 on the satellite transponder, whereby deterioration in the orthogonality among the orthogonal codes transmitted by the communication terminals 1 due to the carrier wave frequency deviation can be diminished.

Figure 16:
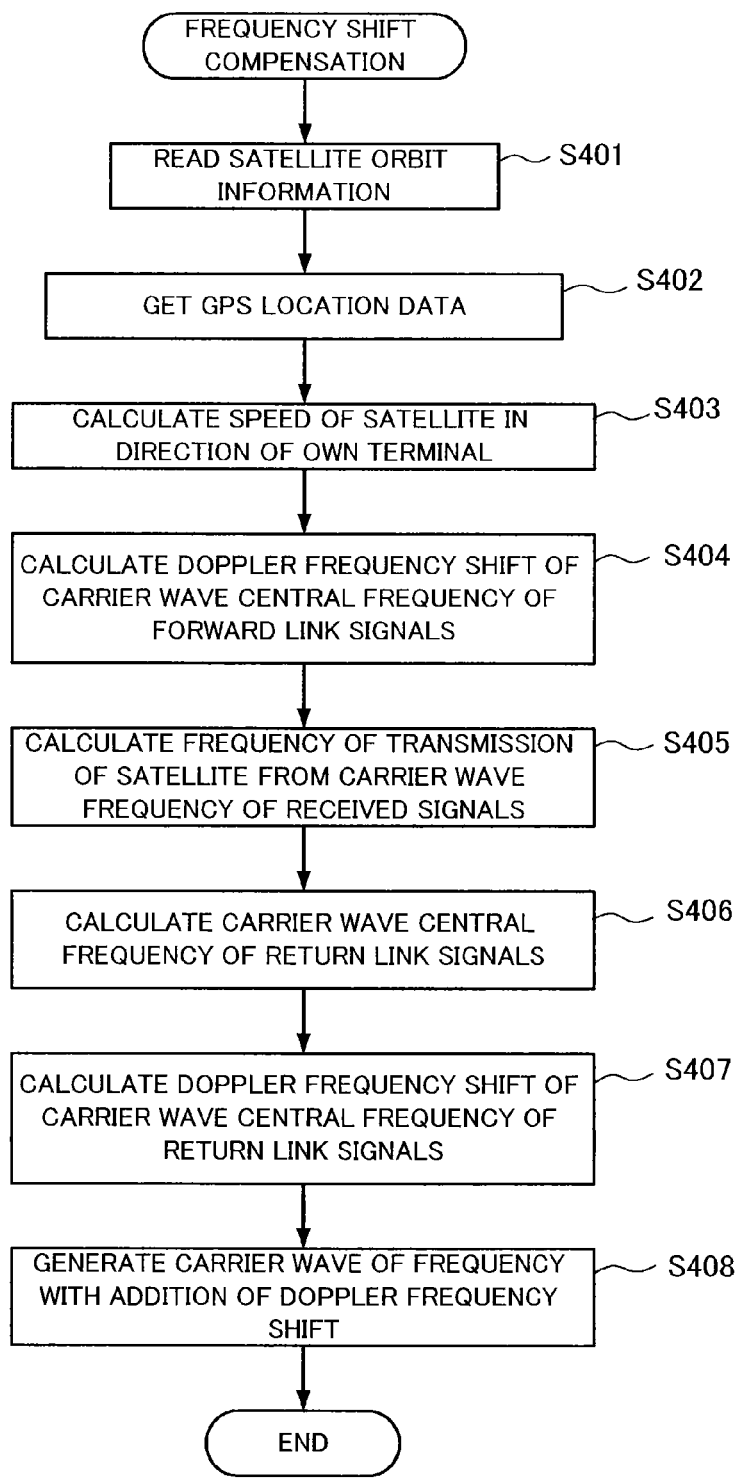
FIG. 16 is a flowchart showing the frequency shift compensation operation at the communication terminal according to Embodiment 1.

FIG. 16 is a flowchart showing the frequency shift compensation operation at the communication terminal according to Embodiment 1. The Doppler frequency shift compensation procedure is executed mainly by the carrier wave generator 26 and Doppler frequency calculator 28 in FIG. 2. First, the Doppler frequency calculator 28 reads satellite orbit information in a memory (Step S401), and gets GPS location data of its own communication terminal 1 from the GPS signal processor 32 (Step S402). The Doppler frequency calculator 28 calculates the speed VSn of the nongeostationary satellite in the direction of its own communication terminal 1 from the satellite orbit information and GPS location data (Step S403), and calculates the Doppler frequency shift ΔFro1 corresponding to the carrier wave central frequency Fro of forward link signals using the speed VSn (Step S404).

Then, the carrier wave generator 26 generates the carrier wave central frequency Fro of forward link signals by Fro=Frn−ΔFro1 based on the carrier wave frequency Frn of received forward link signals entered from the QPSK demodulator 14 (Step S405). The carrier wave generator 26 further generates the carrier wave central frequency Fto of transmission return link signals by Fto=Fro×Rrt (Step S406). The Doppler frequency calculator 28 calculates the carrier wave central frequency ΔFto1 of return link signals using the speed VSn of the satellite 3 in the direction of its own communication terminal 1 (Step S407). The carrier wave generator 26 compensates the Doppler frequency shift corresponding to the transmission carrier wave central frequency Fto on the return link by Ftn=Fto−ΔFto1 (Step S408).

Here, the operation of the communication system and communication terminal according to Embodiment 1 is summarized. The information acquirer 310 of the communication terminals 1 acquires reference time information common to multiple communication terminals 1. The transmission time generator 23 generates a chip clock having a chip duration of which the allowable error is larger than the time accuracy of the time information, and generates a reference for the times to generate orthogonal codes. The orthogonal code generator 22 generates orthogonal codes in time with the reference time. The CDMA spreader 21 spreads transmission signals to be transmitted to the satellite 3 with the orthogonal codes.

Furthermore, it is possible that the delay processor 240 of the communication terminals 1 derivates the distance to the satellite 3 from location information of the communication terminal 1, calculates the delay time (the delay time calculator 29), corrects the transmission signals from the calculated delay time (the delay corrector 24). Furthermore, it is possible that the Doppler frequency processor 250 of the communication terminals 1 corrects deviation in the frequency of transmission signals due to the Doppler frequency shift from change in the relative distance between the satellite 3 and communication terminal 1.

The communication terminals 1 transmit short messages to the base station 2. Even in such a case, the communication terminals 1 receive forward link signals transmitted by the base station 2. Then, the communication terminals 1 transmit transmission signals containing short messages to the base station 2 as return link signals. The base station 2 and communication terminals 1 communicate with each other via the satellite 3, and the satellite 3 relays the communication between the base station 2 and communication terminals 1. Multiple communication terminals 1 synchronize their times to generate orthogonal codes among the multiple communication terminals 1 from the reference time information common to the multiple communication terminals.

The communication terminals 1 generate a chip clock having a chip duration of which the allowable error is larger than the time accuracy of the time information even for transmitting a short message. Here again, the transfer delay time corresponding to the difference between the distance from the location of the communication terminal 1 to the satellite 3 and a reference distance is subtracted from the time information to determine the times to generate orthogonal codes. Furthermore, here again, the carrier wave Doppler frequency shift of return link signals is corrected from the relative moving speed between the satellite 3 and communication terminal 1.

It is possible to allow a user terminal (communication terminal 1) to determine whether to transmit a rescue message, an emergency message, rescue signals, or the like containing location information to the service center 6 via the base station 2 using a satellite line as return link signals (transmission signals) after receiving forward link signals transmitted from the base station 2 upon occurrence of a natural disaster, or to force a user terminal (communication terminal 1) to transmit return link signals (transmission signals) when the terminal has received forward link signals.

Embodiment 2

In Embodiment 1, the orthogonal code start times are synchronized with GPS clock time signals at the chip clock level, and it is assumed that the communication terminals 1 randomly transmit CDMA burst signals toward the nongeostationary satellite 3. On the other hand, in Embodiment 2, the communication terminals 1 transmit CDMA spread burst data in time with slots on the time axis common to multiple communication terminals 1. Consequently, so-called slotted ALOHA satellite communication access is conducted to improve the throughput. In doing do, the communication terminals 1 not only synchronize their orthogonal code start times with GPS clock time signals at the chip clock level but also synchronize the slot times with GPS clock time signals so as to facilitate the synchronization of slots among the communication terminals 1.

In Embodiment 2, CDMA signals modulated by the modulator 25 are transmitted to the satellite 3 at slot times on the basis of the chip clock generated by the transmission time generator 23. Multiple communication terminals 1 synchronize their slot times among multiple communication terminals 1. In Embodiment 2, the base station 2, satellite 3, and communication terminals 1 have the same relationship as in Embodiment 1.

Figure 17A:
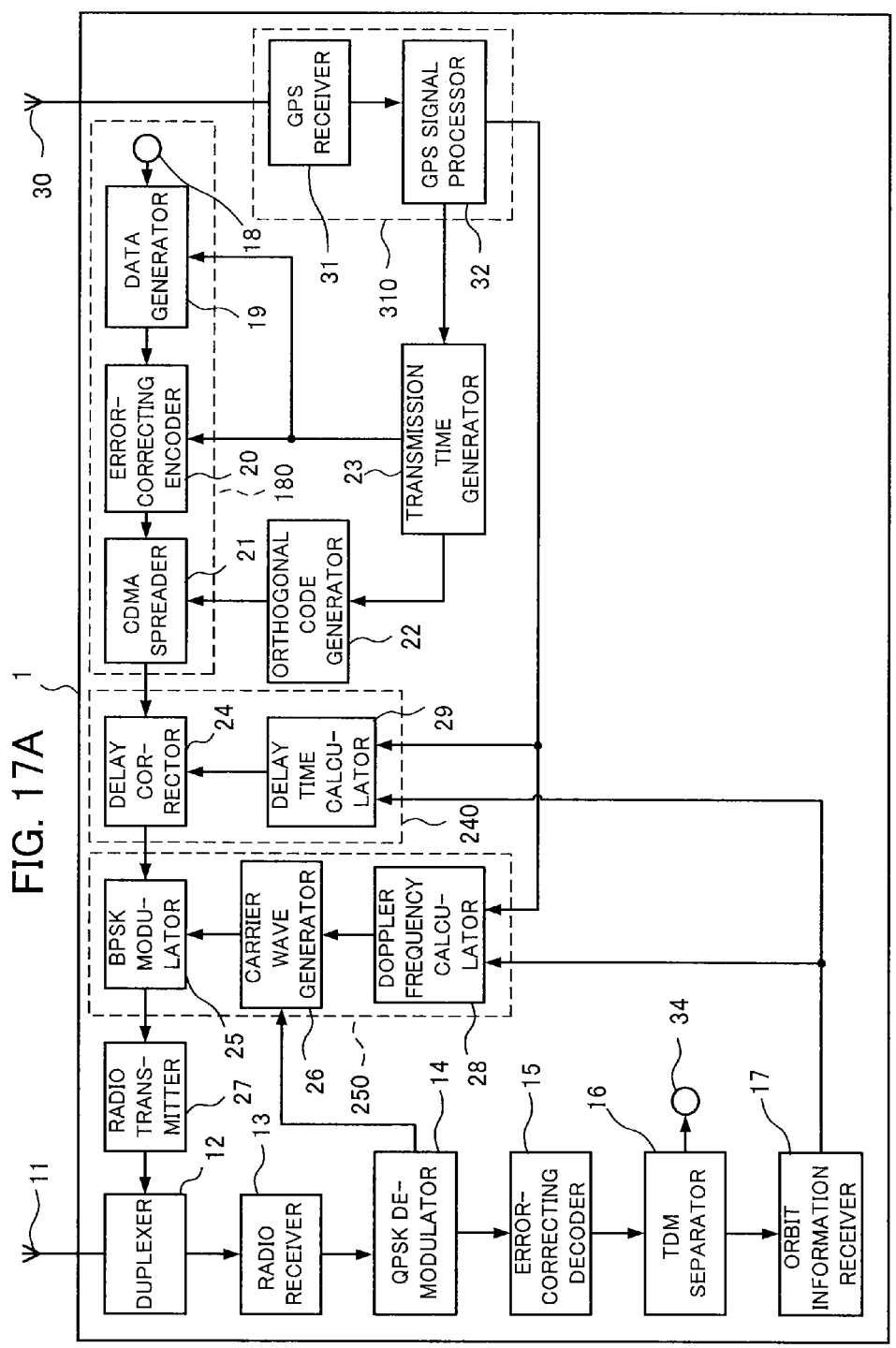
FIG. 17A is a block diagram showing an exemplary configuration of the communication terminal according to Embodiment 2 of the present invention.

FIG. 17A is a block diagram showing an exemplary configuration of the communication terminal according to Embodiment 2 of the present invention. In Embodiment 2, the transmission time generator 23 generates slot times synchronized with GPS clock time signals. The other confirmation is the same as that in Embodiment 1.

Figure 17B:
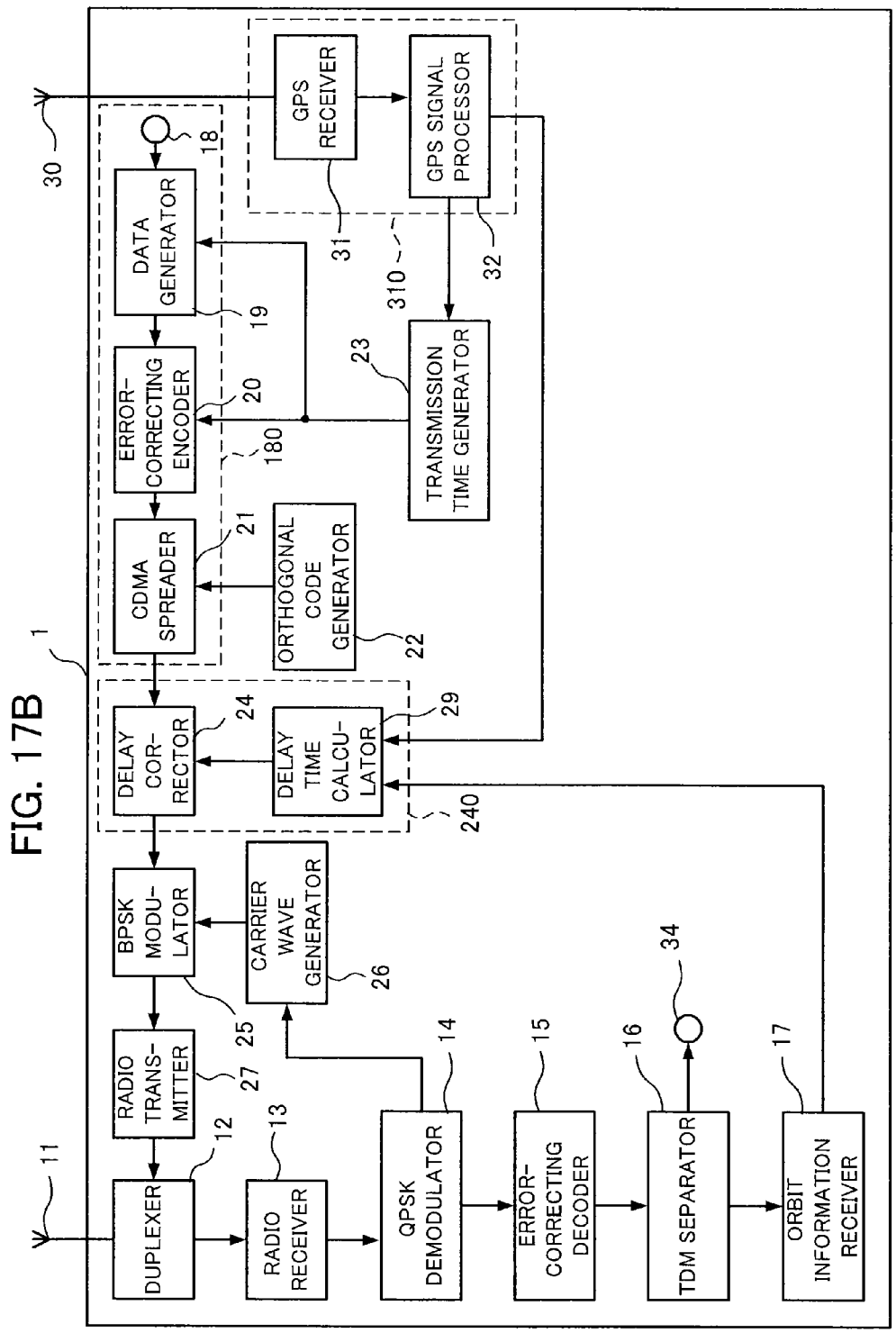
FIG. 17B is a block diagram showing another exemplary configuration of the communication terminal according to Embodiment 2.

FIG. 17B is a block diagram showing another exemplary configuration of the communication terminal according to Embodiment 2. The communication terminal 1 in FIG. 17B is not provided with the Doppler frequency calculator 28 compared with the one in FIG. 17A. FIG. 17B anticipates the case in which the compensation of the Doppler frequency shift is unnecessary.

Figure 18:
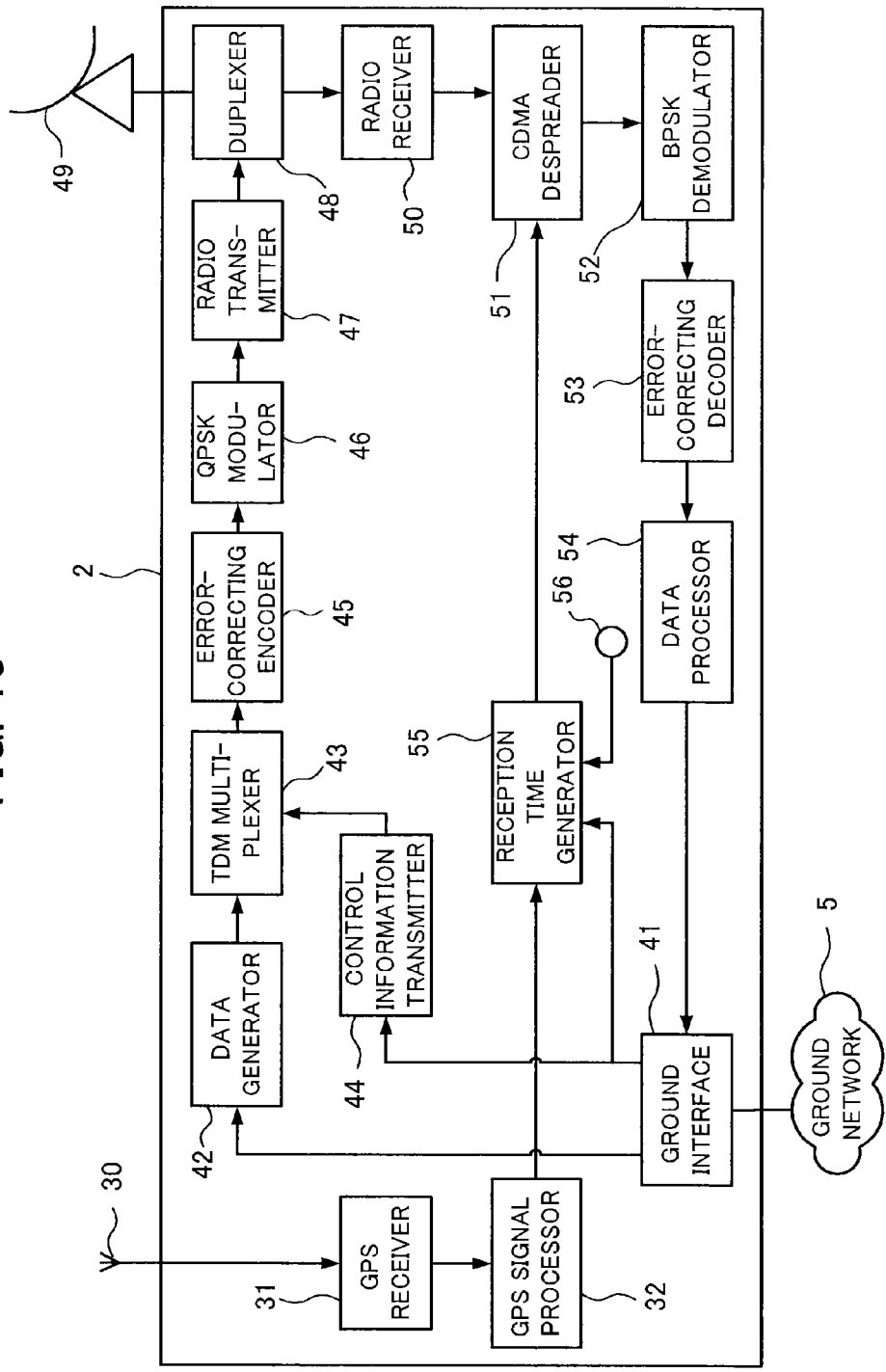
FIG. 18 is a block diagram showing an exemplary configuration of the base station according to Embodiment 2.

FIG. 18 is a block diagram showing an exemplary configuration of the base station according to Embodiment 2. Compared with the configuration of the base station 2 according to Embodiment 1 shown in FIG. 4, the following configuration is added to the base station 2 according to Embodiment 2. The base station 2 in Embodiment 2 receives the GPS signals 10 from the GPS satellite 4 through the GPS antenna 30 and GPS receiver 31 as the communication terminals 1 do. The GPS signal processor 32 processes the received GPS signals 10 and outputs GPS clock time signals to a reception time generator 55.

Using the satellite orbit information from the ground interface 41 and the base station location and reference ground point entered from the input terminal 56, the reception time generator 55 generates a chip clock, orthogonal code start times, and slot times delayed by the delay time from the reference ground point to reception at the base station via the nongeostationary satellite on the basis of the GPS clock time signals from the GPS signal processor 32. The CDMA despreader 51 predicts the temporal position of signals transmitted from the communication terminals 1 and executes CDMA despreading based on the chip clock, orthogonal code start times, and slot times generated by the reception time generator 55.

As described above, the reception time generator 55 generates for the components clock and timing signals synchronized with GPS clock time signals from the GPS signal processor 32. The chip clock generation operation is the same as the chip clock generation method shown in FIG. 3A or FIG. 3C.

Figure 19A:
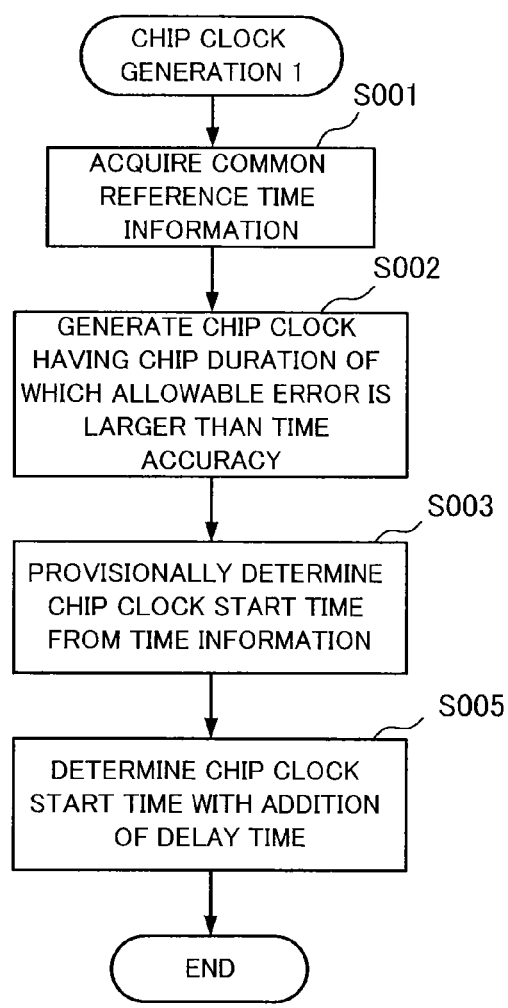
FIG. 19A is a flowchart showing an example of the chip clock generation operation according to Embodiment 2.

FIG. 19A is a flowchart showing an example of the chip clock generation operation according to Embodiment 2. The reception time generator 55 acquires reference time information common to multiple communication terminals 1 as the communication terminals 1 do (Step S001), and generates a chip clock having a chip duration of which allowable error is larger than the time accuracy of the time information (Step S002). Then, the reception time generator 55 provisionally determines a chip clock start time from, for example, the reference time information acquired from the GPS satellite 4 and common to multiple communication terminals 1 (Step S003). Here, the reception time generator 55 determines a chip clock start time by adding a given delay time instead of starting the chip clock at the time determined in the Step S003 (Step S005). In this regard, the time determination step is different from Embodiment 1. The reason is that, as described above, it is necessary to delay return link signals transmitted from the communication terminals 1 by the transfer time from the reference ground point to reception at the base station via the satellite 3.

Figure 19B:
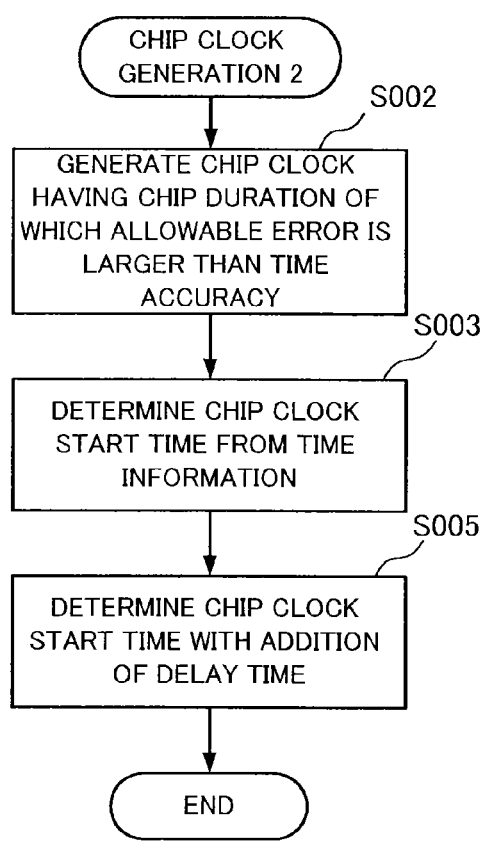
FIG. 19B is a flowchart showing an example of the chip clock generation operation according to Embodiment 2.

In other words, the given delay time means the delay time of transmission signals (return link signals) from the communication terminals 1 from the reference ground point to reception at the base station via the nongeostationary satellite. The chip clock having a chip duration of which the allowable error is longer than the time accuracy (clock time accuracy) is as described in Embodiment 1. Here, the chip clock generation method can eliminate the Step S001 as shown in FIG. 19B if the time information having a given time accuracy can be acquired in advance.

FIG. 20 is a waveform chart showing the orthogonal code start times at the communication terminals according to Embodiment 2 of the present invention. In FIG. 20, the communication terminals 1-1, 1-2, and 1-3 transmit CDMA-spread burst signals based on a chip clock, orthogonal start times, and slot times synchronized with GPS clock time signals and in time with slots on the time axis common to multiple communication terminals 1. The communication terminals 1 randomly select a slot to transmit.

The communication terminals 1 send the chip clock, orthogonal code start times, and slot times generated by the transmission time generator 23 to the data generator 19, error-correcting encoder 20, and CDMA spreader 21. The transmission signal generator 180 randomly selects a slot on the time axis, and transmits CDMA-spread burst signals in time with the selected slot. Consequently, a slotted ALOHA random access in which the phases of the orthogonal codes in CDMA signals transmitted by the communication terminals 1 are controlled to have a phase difference within a chip duration is realized.

FIG. 21 is an illustration showing exemplary transmission parameters of the communication terminal according to Embodiment 2. FIG. 21 exemplifies typical parameters for data burst transmission of the communication terminals 1 in Embodiment 2. With the transmission parameters shown in FIG. 21, the slots are synchronized with GPS clock time signals, for example, as follows. From the second of 00 of each minute of GPS clock time signals, a slot is generated in every 2.5 seconds. Then, 24 slots are generated in a minute. As for the orthogonal code start times, similarly, from the second of 00 of each minute, 250 cycles of orthogonal codes are generated in a slot.

Figure 22:
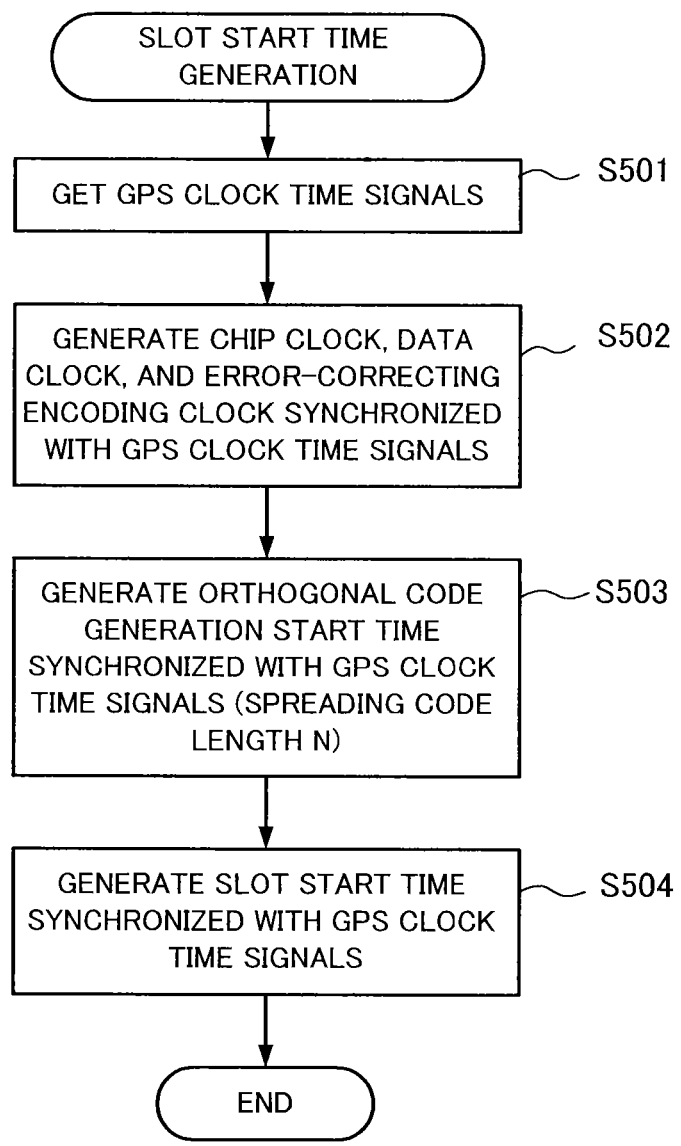
FIG. 22 is a flowchart showing an example of the slot start time generation operation at the communication terminal according to Embodiment 2.

FIG. 22 is a flowchart showing an example of the slot start time generation operation at the communication terminal according to Embodiment 2. In FIG. 22, the Steps S501 to S503 correspond to the Steps S101, 104, and 105 shown in FIG. 5 in Embodiment 1. In Embodiment 2, time slot start times synchronized with GPS clock time signals are generated in Step S504. In this way, the transmission slot times of the communication terminals 1 can easily be synchronized among the communication terminals 1.

Figure 23:
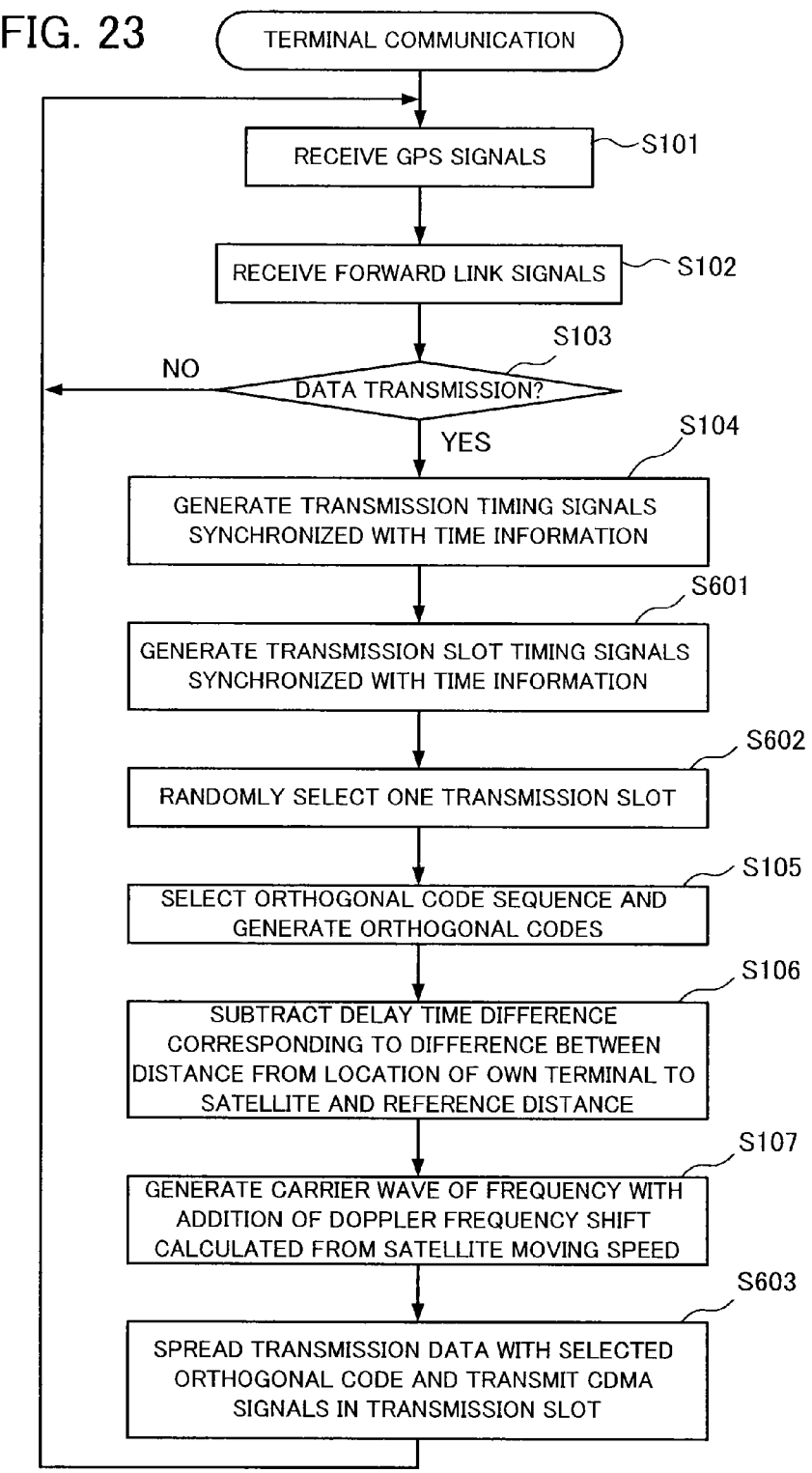
FIG. 23 is a flowchart showing an example of the communication operation of the communication terminal according to Embodiment 2.

FIG. 23 is a flowchart showing an example of the communication operation of the communication terminal according to Embodiment 2. In FIG. 23, the steps having the same numbers as in FIG. 5 refer to the same operation as in Embodiment 1. The transmission time generator 23 generates slot timing signals synchronized with GPS clock time signals (Step S601). The transmission signal generator 180 randomly selects one of the slots (Step S602). A slot is selected, for example, by randomly generating a waiting time for a slot to actually transmit.

The compensation of the delay time difference (Step S106) and the generation of a carrier wave of a frequency with the addition of the Doppler frequency shift (Step S107) are the same as those in Embodiment 1. The transmission signal generator 180 spreads data with the orthogonal codes generated by the orthogonal code generator 22 (Step S105) and transmits the data as CDMA burst signals toward the satellite 3 in a selected slot (Step S603).

Here, FIG. 23 shows a method of randomly selecting one of the transmission slots and one of the orthogonal codes and executing random access. It is possible that the transmission signal generator 180 further randomly selects one of multiple frequency channels in FDMA and executing random access using a selected transmission slot, orthogonal code, and frequency channel. In this way, unless all of the transmission slot, orthogonal code, and frequency channel match, no collision of random access burst occurs, whereby the probability of collision of random access burst can be lowered. Consequently, the random access throughput can advantageously be improved.

Figure 24:
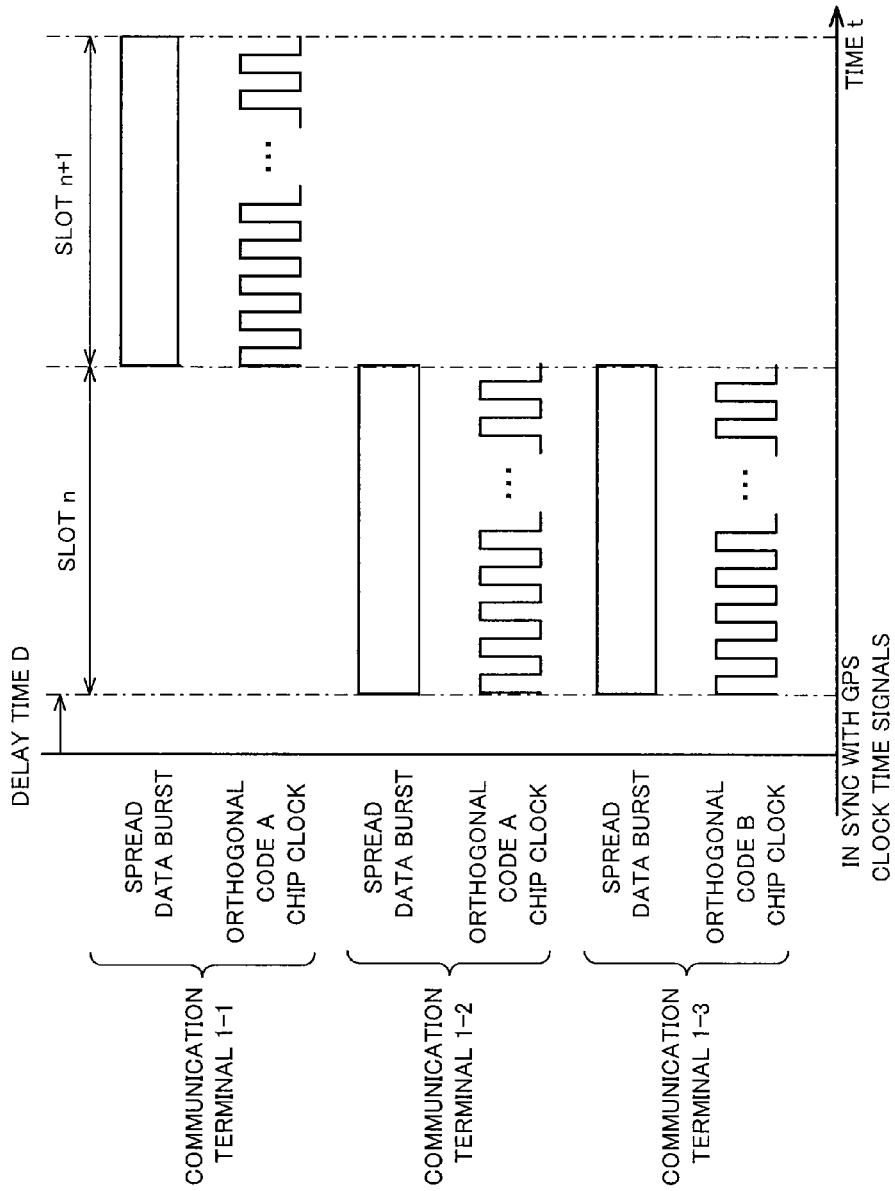
FIG. 24 is a waveform chart showing the time slot start times at the communication terminals according to Embodiment 2.

FIG. 24 is a waveform chart showing the time slot start times at the communication terminals according to Embodiment 2. The GPS clock times-synchronized chip clock, orthogonal code start times (not shown), and transmission slot times of CDMA signals transmitted by the communication terminals 1-1 to 1-3 are delayed by a round-trip delay time of D seconds to the satellite 3 upon reception at the base station 2. As shown in Embodiment 1, the delay time difference on the return link due to the location of the communication terminals 1 is compensated upon transmission at the communication terminals 1. At the base station 2, the delay time of D seconds can be estimated by calculating the round-trip time between the reference ground point and satellite.

For example, in the case of using a quasi-zenith satellite as the nongeostationary satellite 3, assuming that the quasi-zenith satellite is situated 36,000 km directly above the reference ground point and the base station 2 is located at geographically the same location as the reference ground point, the delay time D is calculated to be 0.24 seconds. Here, if the delay due to the satellite transponder and/or the delay due to the base station reception system is not negligible, it is possible to measure the delay time in advance and add the delay time to the above delay time D.

Thus, the chip clock, orthogonal code start times, and slot times of CDMA signals received from the communication terminals 1 can easily be estimated at the base station reception end by receiving the GPS signals 10 from the GPS satellite 4 also at the base station 2, generating GPS clock time signals, and delaying the chip clock, orthogonal code start times, and slot times so generated as to be synchronized with the GPS clock signals by D seconds. Consequently, the effect of expediting the capture and synchronization of the orthogonal code, chip clock, burst signals by the CDMA despreader 51 can be obtained. Needless to say, delaying the chip clock, orthogonal code start times, and slot times by D seconds corresponds to the above-described given delay time.

Figure 25:
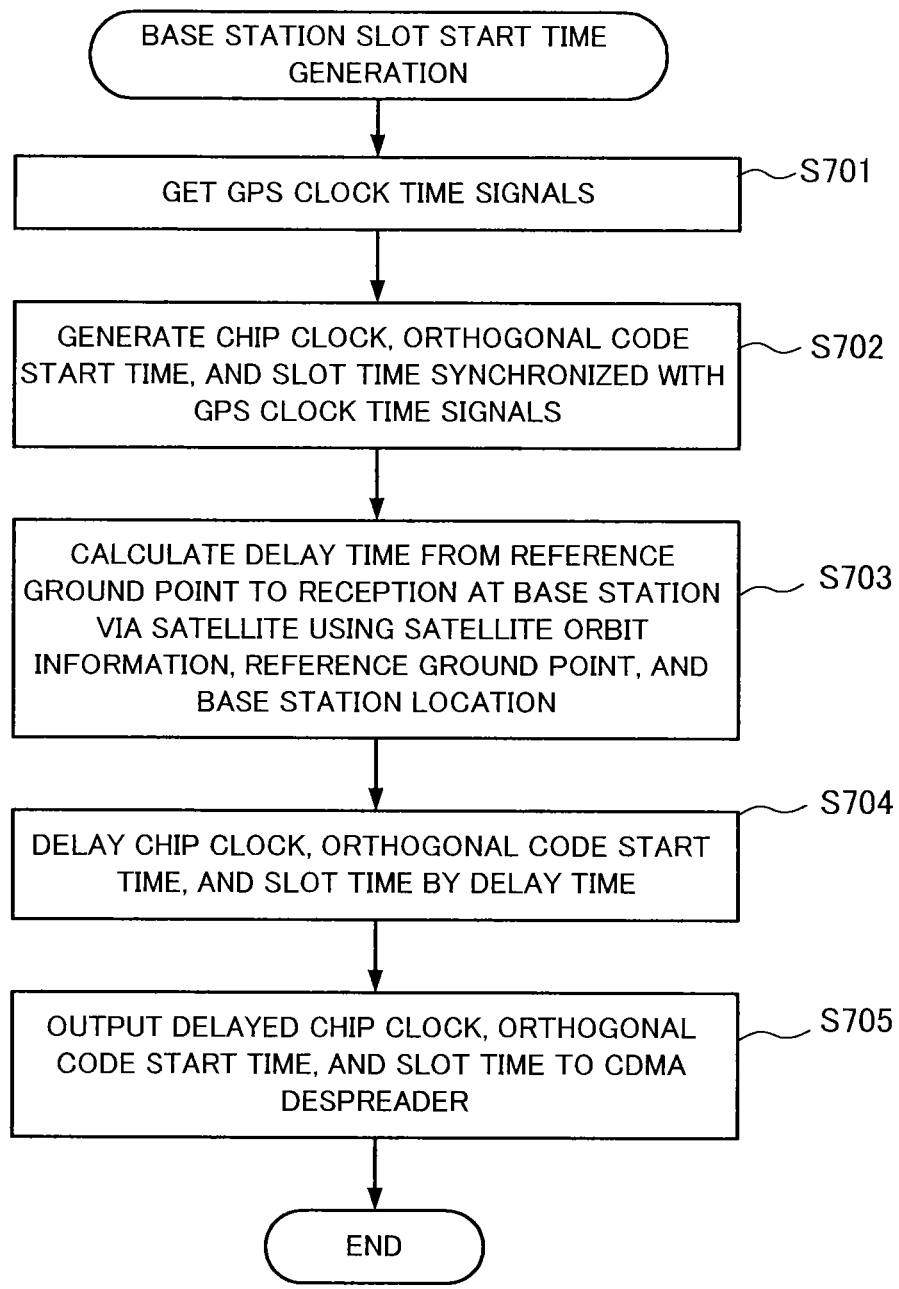
FIG. 25 is a flowchart showing an example of the slot start time generation operation at the base station according to Embodiment 2.

FIG. 25 is a flowchart showing an example of the slot start time generation operation at the base station according to Embodiment 2. The reception time generator 55 of the base station 2 gets GPS clock time signals from the GPS signal processor 32 (Step S701). Then, the reception time generator 55 generates a chip clock, orthogonal code start times, and slot times synchronized with the GPS clock time signals (Step S702). Then, using the satellite orbit information, reference ground point, and base station location, the reception time generator 55 calculates the delay time from the reference ground point to reception at the base station via the nongeostationary satellite (Step S703). Here, the satellite orbit information is entered from the ground interface 41 and the reference ground point and base station location are entered from the input terminal 56. The reference ground point and base station location can be stored in a not-shown memory in advance.

The reception time generator 55 delays the chip clock, orthogonal code start times, and slot times by the delay time (Step S704), and outputs their timing signals to the CDMA despreader 51 (Step S705). In order to despread the CDMA burst signals from the communication terminals 1, the chip clock, orthogonal code start times, and burst times should be estimated from the received signals. The CDMA despreader 51 can save the time necessary for estimating the burst time by using the delayed chip clock, orthogonal code start times, and slot times. Consequently, the effect of expediting the capture and synchronization of the orthogonal codes, chip clock, and burst signals is obtained.

As described above, in Embodiment 2, the communication terminals 1 randomly select a slot on the time axis common to multiple communication terminals 1 and transmit CDMA-spread burst data in time with the selected slot. Consequently, so-called slotted ALOHA satellite communication access is conducted and the throughput can be improved. Furthermore, the random access throughput can further be improved by randomly selecting one of multiple frequency channels in FDMA and executing random access using the selected transmission slot, orthogonal code, and frequency channel.

The communication terminals 1 not only synchronize the orthogonal code start times with GPS clock time signals at the chip clock level but also synchronize the slot times with GPS clock time signals, whereby the slots can easily be synchronized among the communication terminals 1. At the base station reception end, the chip clock, orthogonal code start times, and slot times are delayed by the delay time from the reference ground point to reception at the base station via the nongeostationary satellite (a given delay time), whereby the effect of expediting the capture and synchronization of the orthogonal codes, chip clock, and burst signals is obtained.

Embodiment 3

Figure 26:
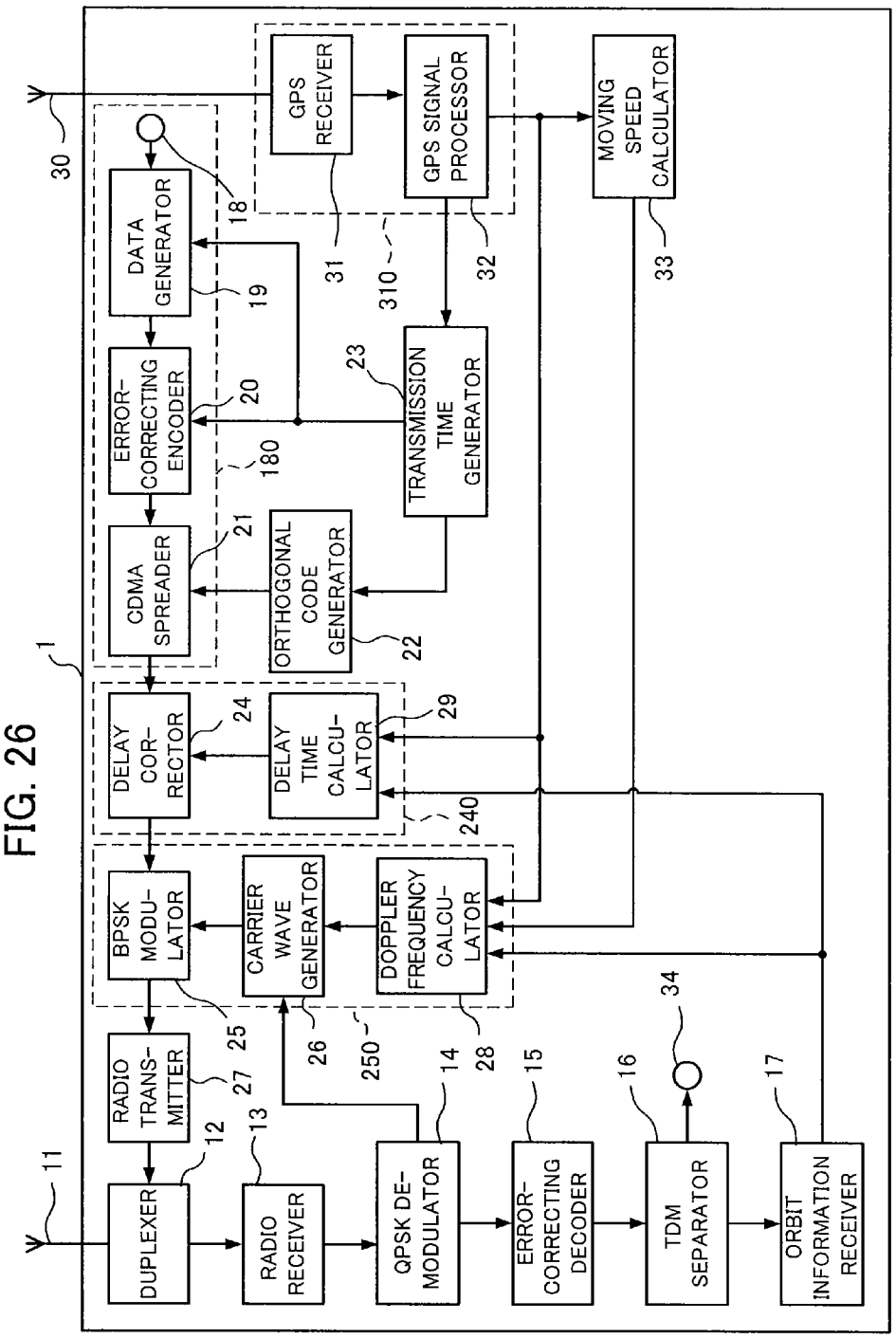
FIG. 26 is a block diagram showing an exemplary configuration of the communication terminal according to Embodiment 3 of the present invention.

FIG. 26 is a block diagram showing an exemplary configuration of the communication terminal according to Embodiment 3 of the present invention. In Embodiment 3, the Doppler frequency shift caused by the velocity component in the direction of the nongeostationary satellite of the moving speed of the communication terminals 1 with respect to the ground is compensated. The communication system of Embodiment 3 has the same configuration as that of Embodiment 1. The communication terminals 1 in Embodiment 3 comprise a moving speed calculator 33 in addition to the configuration in Embodiment 1. The other configuration is the same as that of Embodiment 1.

For example, the moving speed calculator 33 calculates the moving speed and moving direction of the communication terminal 1 from GPS location data output from the GPS signal processor 32 and outputs the moving speed and moving direction to the Doppler frequency calculator 28. The Doppler frequency calculator 28 calculates the Doppler frequency shift from the moving speed of the communication terminal 1 with respect to the ground surface.

Alternatively, the communication terminals 1 acquire the moving speed of the nongeostationary satellite 3 with the orbit information receiver 17 as in Embodiments 1 and 2. Then, the Doppler frequency calculator 28 calculates the Doppler frequency shift from the moving speed of the communication terminal 1 and the moving speed of the nongeostationary satellite 3 with respect to the ground surface.

The Doppler frequency calculator 28 calculates the Doppler frequency shift that occurs as the nongeostationary satellite 3 and communication terminal 1 move and that corresponds to the RF carrier wave frequency using the satellite orbit information from the orbit information receiver 17, GPS location data from the GPS signal processor 32, and terminal moving speed data and terminal moving direction data from the moving speed calculator 33.

Figure 27:
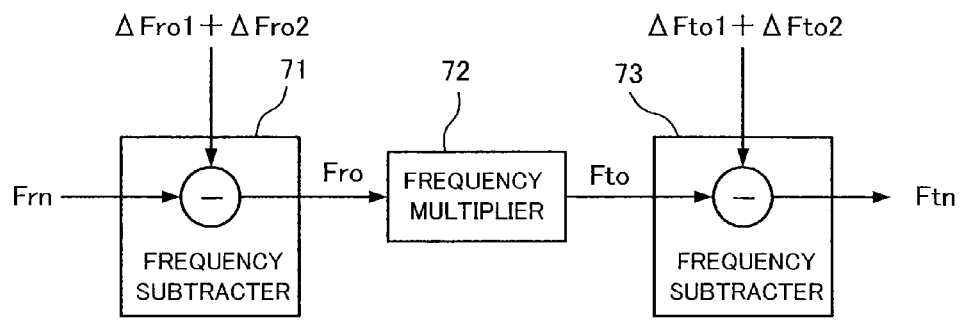
FIG. 27 is a block diagram showing the frequency subtracters and frequency multiplier at the communication terminal according to Embodiment 3.

FIG. 27 is a block diagram showing the frequency subtracters and frequency multiplier at the communication terminal according to Embodiment 3. In FIG. 27, compared with FIG. 15, frequency deviation of forward link signals, $\Delta Fro1+\Delta Fro2$, is entered into a frequency subtracter 71 instead of $\Delta Fro1$. Furthermore, frequency deviation of return link signals, $\Delta Fto1+\Delta Fto2$, is entered into a frequency subtracter 73 instead of $\Delta Fto1$.

As described in Embodiment 1, $\Delta Fro1$ presents the Doppler frequency shift corresponding to the central frequency Fro of forward link signals due to relative movement of the satellite 3 to the communication terminal 1. On the other hand, $\Delta Fto1$ presents the Doppler frequency shift corresponding to the central frequency Fto of return link signals due to relative movement of the satellite 3 to the communication terminal 1. $\Delta Fro2$ presents the Doppler frequency shift corresponding to the central frequency Fro of forward link signals due to relative movement of the communication terminal 1 to the satellite 3. On the other hand, $\Delta Fto2$ presents the Doppler frequency shift corresponding to the central frequency Fto of return link signals due to relative movement of the communication terminal 1 to the satellite 3. Here, it is assumed that $\Delta Fro2$ and $\Delta Fto2$ are positive when the satellite 3 and communication terminal 1 come closer to each other. With reference to FIG. 14, the following expression (21) is established:

$$\Delta Fro2 = Fro \cdot VTns/C$$

$$\Delta Fto2 = Fto \cdot VTns/C \qquad (21)$$

in which C is the light speed, and VTns is the moving speed of the communication terminal 1 in the direction of the satellite 3.

Thus, the Doppler frequency shift of the transmission carrier wave frequency of a communication terminal 1-n can be compensated based on the moving speed of the communication terminal 1 in the direction of the satellite 3 as shown in FIG. 27.

Figure 28:
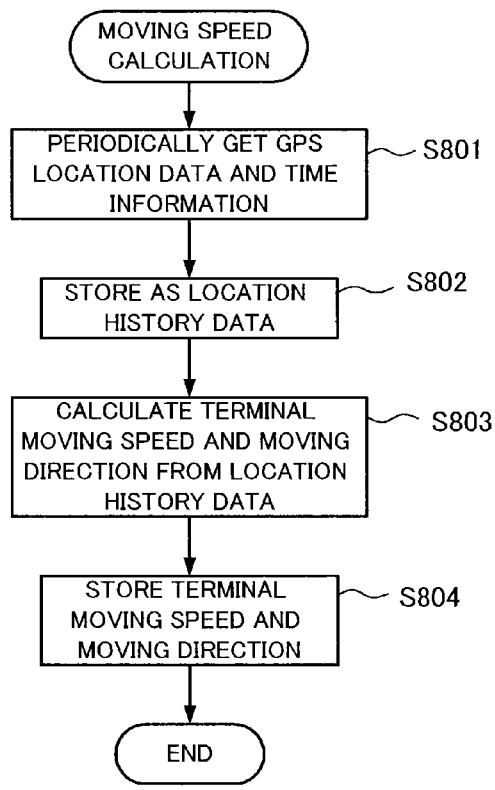
FIG. 28 is a flowchart showing an example of the moving speed calculation operation at the communication terminal according to Embodiment 3.

FIG. 28 is a flowchart showing an example of the moving speed calculation operation at the communication terminal according to Embodiment 3. The moving speed calculator 33 periodically gets GPS location data and the acquisition clock time thereof from the GPS signal processor 32 (Step S801), and stores the GPS location data and acquisition clock time in a memory as location history data (Step S802). The moving speed calculator 33 reads the location history data from the memory and calculates an estimated current moving speed and moving direction of the communication terminal 1 (Step S803). Then, the moving speed calculator 33 stores the above current moving speed and moving direction of the communication terminal 1 in a memory as the current moving speed and moving direction (Step S804).

Here, in FIG. 28, the moving speed calculator 33 uses the GPS location data to obtain the moving speed and moving direction of the communication terminal 1. The moving speed calculator 33 can use a gyro sensor, acceleration sensor, or geomagnetic sensor provided on the communication terminal 1 (portable terminal) to obtain the moving speed and moving direction of the communication terminal 1. In such a case, the gyro sensor, acceleration sensor, or geomagnetic sensor constitutes a part of the moving speed calculator 33, whereby it is unnecessary to connect the moving speed calculator 33 and GPS signal processor 32 (information acquirer 310).

FIG. 29 is a flowchart showing the frequency shift compensation operation at the communication terminal according to Embodiment 3. The Doppler frequency calculator 28 reads the current moving speed and moving direction of its own communication terminal 1 from the memory of the moving speed calculator 33 (Step S901). Then, the Doppler frequency calculator 28 determines whether its own communication terminal 1 is moving based on the current moving speed of its own communication terminal 1 in S902 (Step S902).

If the communication terminal 1 is not moving with respect to the ground surface (Step S902; NO), the Doppler frequency shift is compensated according to FIG. 16. If the communication terminal 1 is moving (Step S902; YES), the satellite orbit information is read from the orbit information receiver 17 (Step S903). Furthermore, the GPS location data are entered from the GPS signal processor 32 (Step S904). Then, the Doppler frequency calculator 28 calculates the velocity VSn of the nongeostationary satellite 3 in the direction of its own communication terminal 1 from the satellite orbit information and GPS location data, and further calculates the velocity VTns of the communication terminal 1 in the direction of the satellite from the satellite orbit information, GPS location data, and current moving speed and moving direction of the communication terminal 1 (Step S905).

The Doppler frequency calculator 28 calculates the Doppler frequency shifts $\Delta Fro1$ and $\Delta Fro2$ corresponding to the carrier wave central frequency Fro of forward link signals using VSn and VTns, and outputs $\Delta Fro1$ and $\Delta Fro2$ to the carrier wave generator 26 (Step S906). Furthermore, the Doppler frequency calculator 28 calculates the Doppler frequency shifts $\Delta Fto1$ and $\Delta Fto2$ corresponding to the carrier wave central frequency Fto of return link signals using VSn and VTns, and outputs $\Delta Fto1$ and $\Delta Fto2$ to the carrier wave generator 26 (Step S907).

The carrier wave generator 26 generates Fro by $Fro=Frn-(\Delta Fro1+\Delta Fro2)$ using the carrier wave frequency Frn of received forward link signals (Step S908). Furthermore, the carrier wave generator 26 calculates the carrier wave central frequency Fto of transmission return link signals by $Fto=Fro \times Rrt$ (Step S909). Finally, the carrier wave generator 26 compensates the Doppler frequency shift of the transmission carrier wave frequency Fto by $Ftn=Fto-(\Delta Fto1+\Delta Fto2)$ (Step S910). The communication terminal 1 repeats from the Step S901 for each transmission.

As described above, in Embodiment 3, the communication terminals 1 calculate the Doppler frequency shift caused by relative movement between the satellite 3 and communication terminal 1 in consideration of the moving speed of the communication terminal 1 with respect to the ground surface in addition to the Embodiment 1. Even in the case of the communication terminal 1 moving with respect to the ground surface, the Doppler frequency shift of the carrier wave frequency of return link signals transmitted by the communication terminal 1 is compensated in accordance with the moving speed and moving direction of the communication terminal 1. Consequently, the carrier wave frequency deviation among return link signals transmitted by the communication terminals 1 on the satellite transponder is nearly 0, whereby deterioration in the orthogonality among the orthogonal codes transmitted by the communication terminals 1 can be diminished to nearly zero.

Embodiment 4

In Embodiments 1 and 2, it is assumed that multiple communication terminals 1 are spread to the extent that difference in the distance to the nongeostationary satellite 3 is not negligible and the moving speeds of the communication terminals 1 are negligible. In Embodiment 3, it is assumed that the communication terminals 1 are moving at speeds that make the Doppler frequency shift non-negligible. In Embodiment 4, it is assumed that multiple communication terminals 1 are gathered in a small area in which difference in the distance to the nongeostationary satellite 3 is negligible. This means that the communication terminals 1 do not need to comprise the delay processor 240.

Figure 30A:
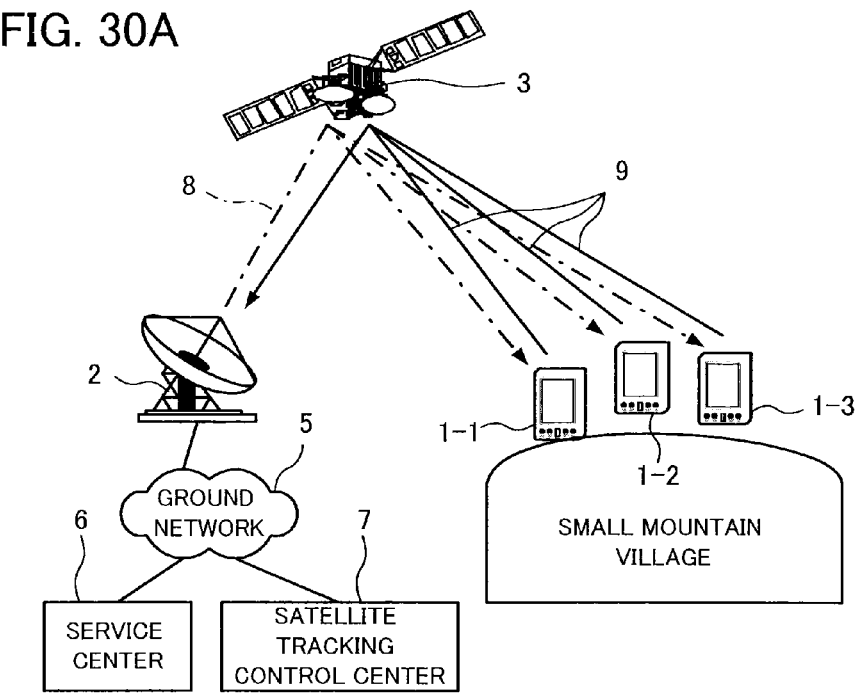
FIG. 30A is a schematic illustration showing a configuration of the communication system according to Embodiment 4 of the present invention.
Figure 30B:
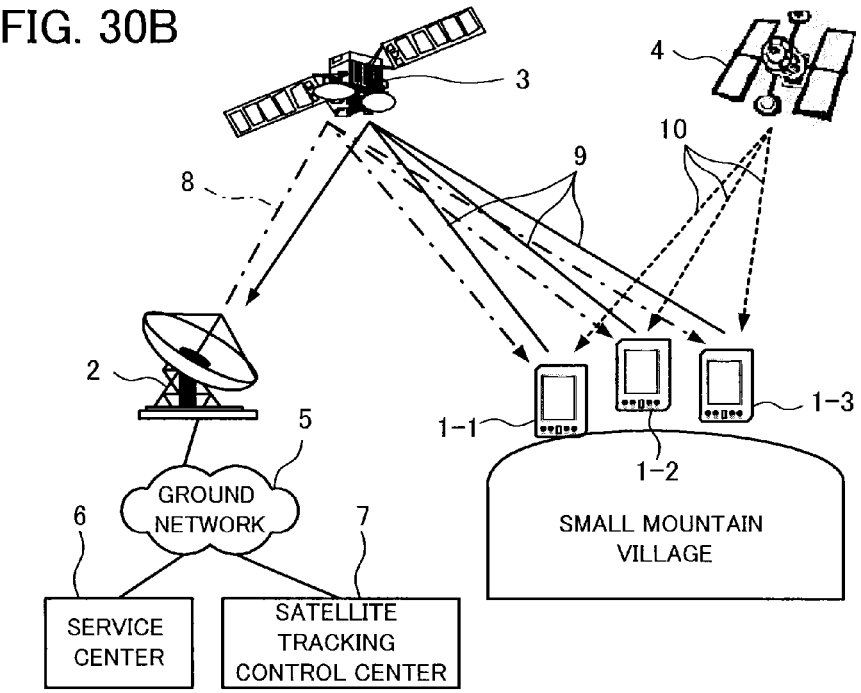
FIG. 30B is a schematic illustration showing another configuration of the communication system according to Embodiment 4.

FIG. 30A is a schematic illustration showing the configuration of the communication system according to Embodiment 4 of the present invention. The communication system of Embodiment 4 is applied, for example, to the case in which the communication terminals 1 are located in a small mountain village or the like. FIG. 30A shows a case of communication excluding reception from the GPS satellite 4. FIG. 30B is a schematic illustration showing another configuration of the communication system according to Embodiment 4. FIG. 30B shows a case of communication including reception from the GPS satellite 4. Multiple communication terminals 1 shown in FIGS. 3A and 3B can be those moving within a range in which no delay time difference due to difference in the distance to the satellite 3 among the communication terminals 1 occurs.

FIGS. 31 to 34 are functional block diagrams of the communication terminal according to Embodiment 4. The communication terminals 1 in FIGS. 31 and 34 correspond to the configuration in FIG. 30A. The communication terminals 1 in FIGS. 32 and 33 correspond to the configuration in FIG. 30B. In Embodiment 4, multiple communication terminals 1 are gathered in a small area in which difference in the distance to the satellite 3 is negligible; therefore, the communication terminals 1 do not comprise the delay processor 240 as shown in FIGS. 31 to 34.

Figure 34:
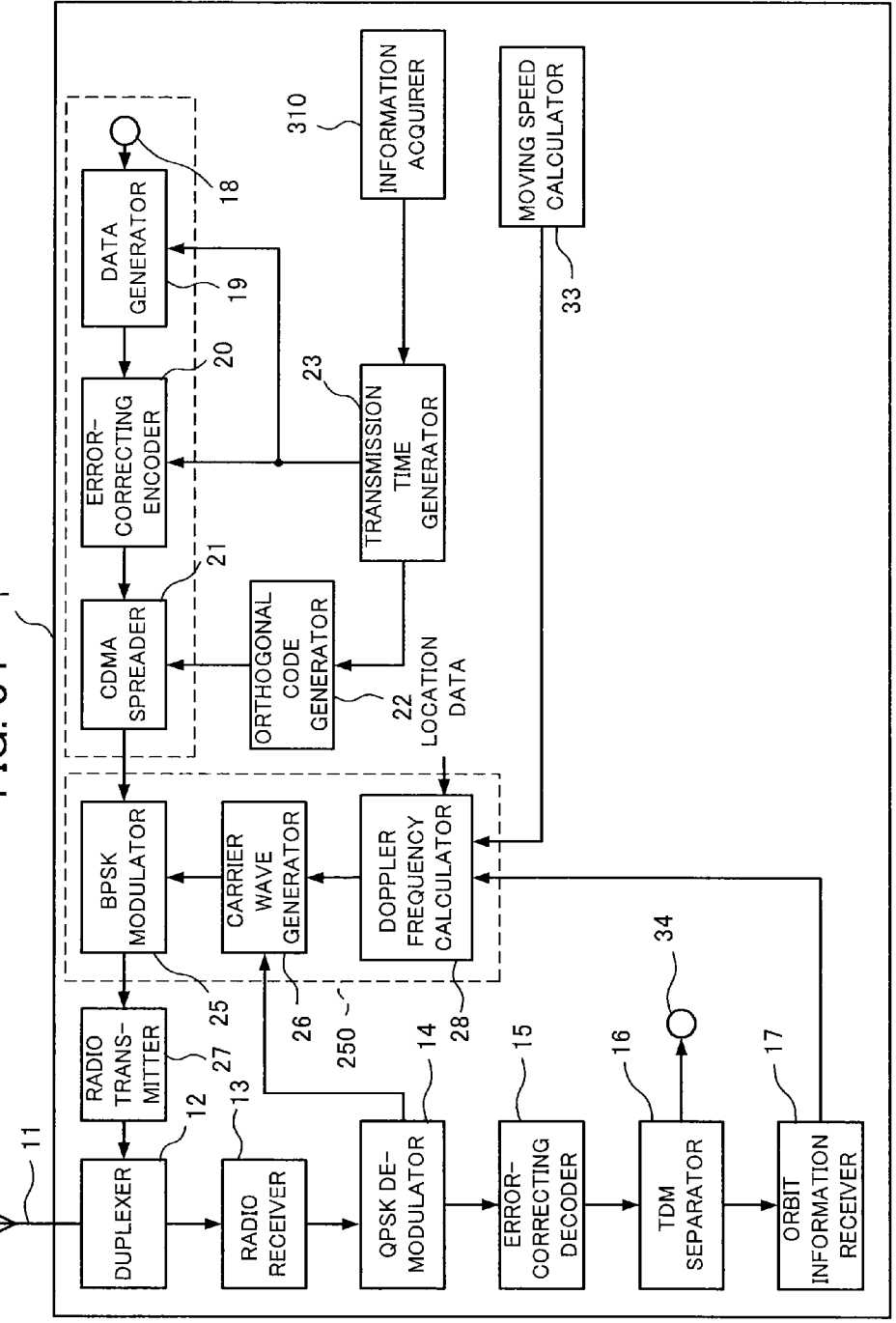
FIG. 34 is a functional block diagram of the communication terminal according to Embodiment 4.

The communication terminals 1 in FIGS. 31 and 34 do not comprise the GPS antenna 30, GPS receiver 31, and GPS signal processor 32 compared with the configuration of Embodiment 1. The information acquirer 310 acquires reference time information common to multiple communication terminals 1 from an external source or internally retains the reference time information. For example, it is possible that a device distributing time information is provided in the village where the communication terminals 1 are located and the communication terminals 1 acquire the time information from the device. An alternative idea is that the communication terminals 1 each incorporate a sufficiently accurate clock and periodically calibrate the clock. The other configuration is the same as that of the communication terminals 1 in Embodiment 1.

Also in Embodiment 4, the communication terminals 1 generate a chip clock on the basis of the reference time information common to multiple communication terminals 1 and use the chip clock as the reference for generating orthogonal codes. The communication terminals 1 generate a chip clock having a chip duration of which the allowable error is larger than the time accuracy of the time information. Furthermore, the communication terminals 1 transmit transmission signals containing a short message at slot times on the basis of the time information and common to multiple communication terminals 1.

Furthermore, the communication terminals 1 compensate the Doppler frequency shift of the transmission carrier wave based on the moving speed of the satellite 3 with respect to the communication terminal 1. Since the communication terminals 1 are gathered in a small area in which difference in the distance to the satellite 3 is negligible, for example, location data of the location where the communication terminals 1 are gathered are stored and used in calculating the Doppler frequency shift. Here, the location data of the communication terminals 1 retained by the communication terminals 1 themselves are entered into the Doppler frequency calculator 28 in place of the GPS location data. It is also possible that the Doppler frequency calculator 28 retains the location data of the communication terminals 1.

The communication terminal 1 in FIG. 34 comprises a moving speed calculator 33 in addition to the configuration in FIG. 31. The communication terminal 1 in FIG. 34 calculates the speed of the communication terminal 1 using, for example, a gyro sensor, acceleration sensor, or geomagnetic sensor and supplies the speed to the Doppler frequency calculator 28. The communication terminal 1 in FIG. 34 can compensate the Doppler frequency shift caused by the moving speed of the communication terminal 1 with respect to the ground surface as in Embodiment 3.

Figure 32:
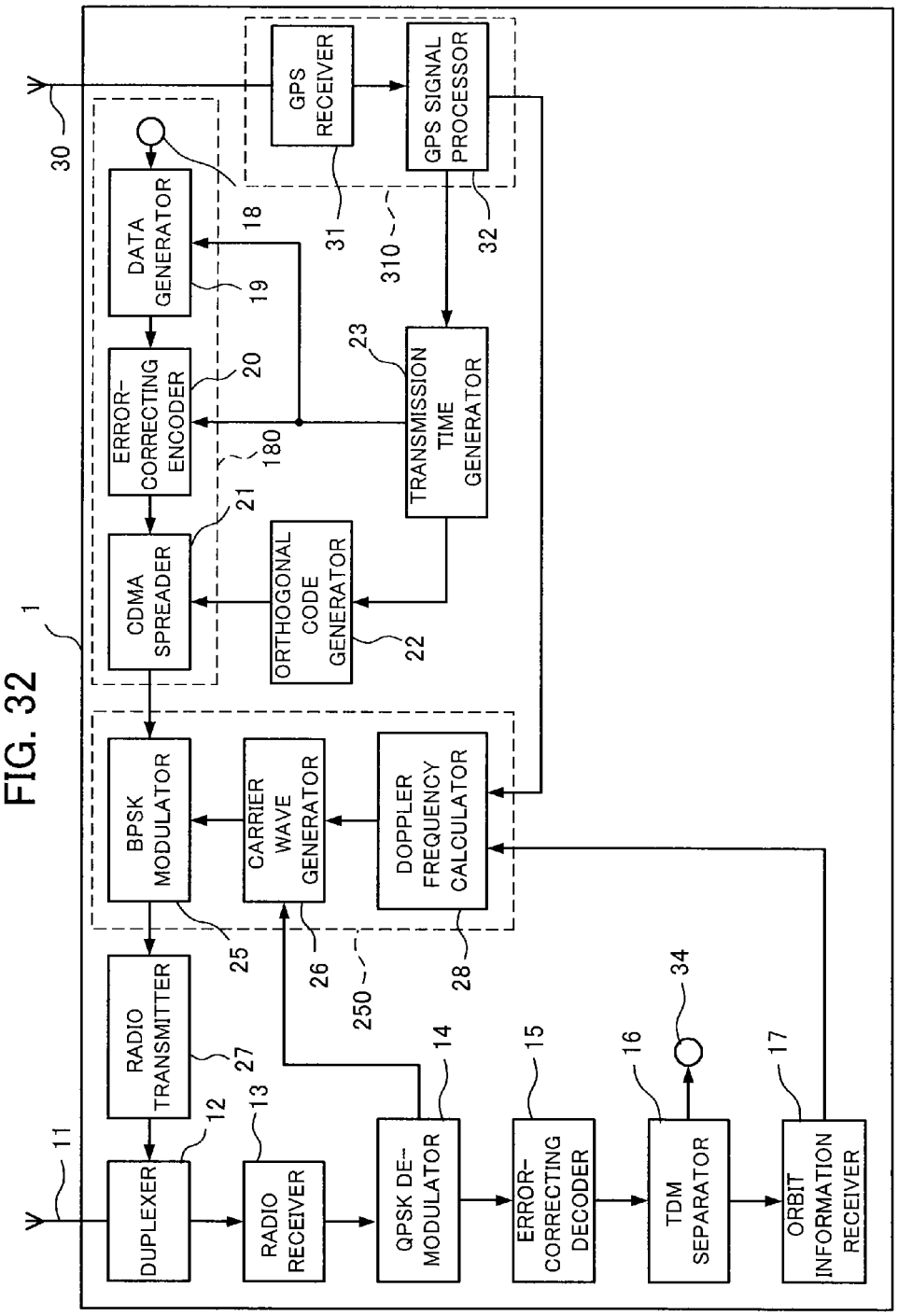
FIG. 32 is a functional block diagram of the communication terminal according to Embodiment 4.

The communication terminal 1 in FIG. 32 has the configuration of the communication terminal 1 of Embodiment 1 shown in FIG. 2 from which the delay processor 240 is eliminated. The communication terminal 1 in FIG. 32 is the same as Embodiment 1 except that the procedure to compensate the difference in delay time among the communication terminal 1 is not conducted.

Figure 33:
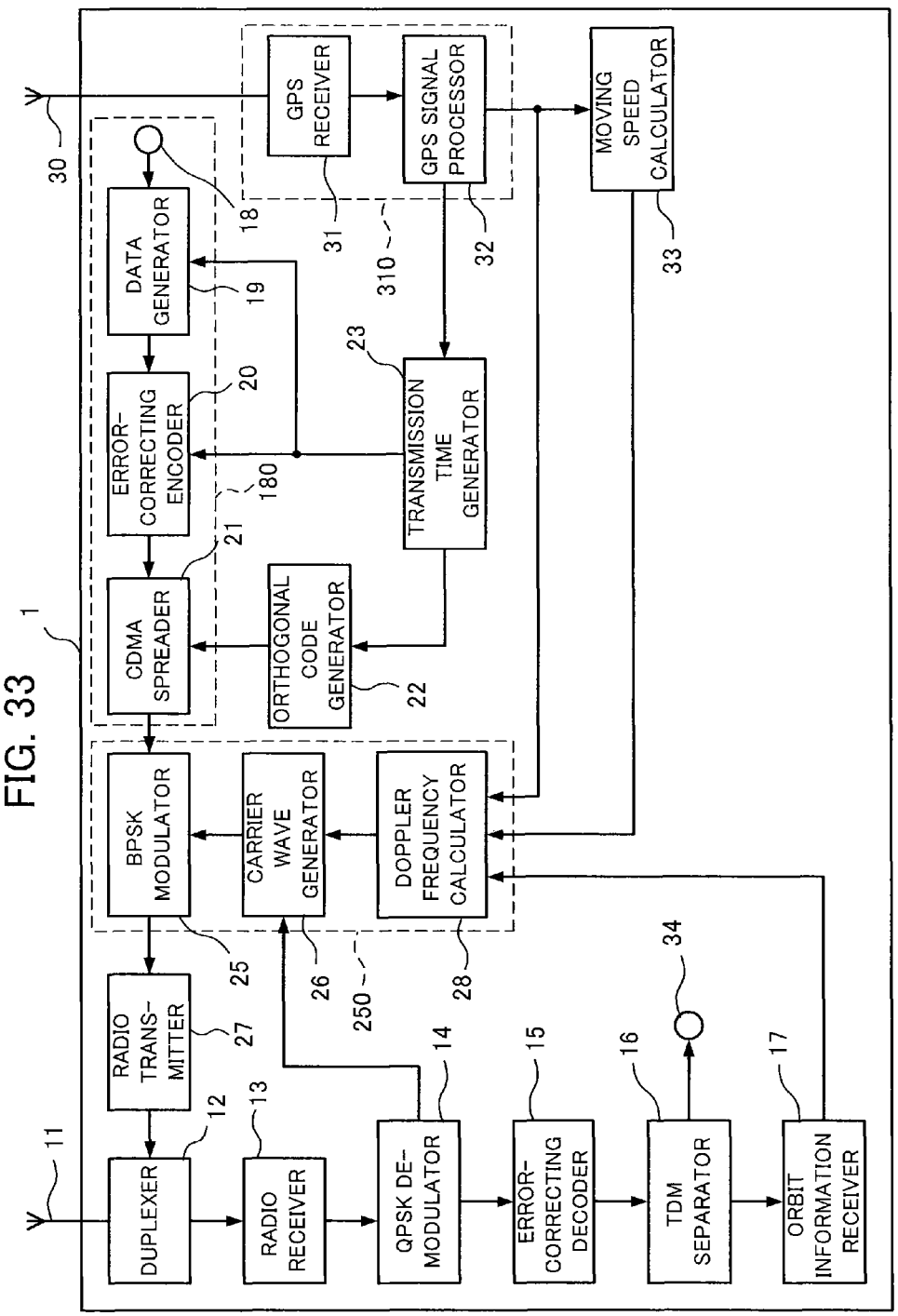
FIG. 33 is a functional block diagram of the communication terminal according to Embodiment 4.

The communication terminal 1 in FIG. 33 has the configuration of the communication terminal 1 of Embodiment 3 shown in FIG. 26 from which the delay processor 240 is eliminated. The communication terminal 1 in FIG. 33 is the same as Embodiment 3 except that the procedure to compensate the difference in delay time among the communication terminal 1 is not conducted.

As described above, in Embodiment 4, when multiple communication terminals 1 are gathered in a small area in which difference in the distance to the satellite 3 is negligible, the orthogonal codes in CDMA signals transmitted from multiple communication terminals 1 can be synchronized on the transponder (transmission path) of the satellite 3 without conducting the procedure to compensate the difference in delay time among the communication terminals 1.

In Embodiments 1 to 4, a satellite communication access system and a chip clock generation method and orthogonal code generation method necessary for the satellite communication access system can be obtained. More specifically, when multiple communication terminals 1 access a base station 2 via a nongeostationary satellite 3 such as a quasi-zenith satellite in CDMA using orthogonal codes, the orthogonal codes in CDMA signals transmitted from the communication terminals 1 are synchronized with a phase difference within a chip duration on the nongeostationary satellite 3, whereby satellite communication with little interference due to mutual correlation among the orthogonal codes can be realized. Furthermore, a chip clock generation method and orthogonal code generation method suitable for the access system of such satellite communication, and a communication system, communication terminal, and communication method including those methods can be provided.

The communication system, communication terminal, and communication method including the chip clock generation method and orthogonal code generation method according to Embodiments 1 to 4 can be implemented by mutually exchanging the configuration, situation, and short message contents among the embodiments. The short message according to Embodiments 1 to 4 is not restricted to those upon emergency, and can be those for providing information on the Internet. The communication terminals 1 according to Embodiments 1 to 4 can be mobile or fixed. Furthermore, the communication terminals 1 according to Embodiments 1 to 4 can be configured by adding hardware or software to a terminal device such as a cell-phone, communication device, and disaster prevention radio device.

The present application claims the priority based on Japanese Patent Application Nos. 2012-182584, 2012-182585, 2012-182586, 2012-182587, and 2012-182588, filed on Aug. 21, 2012, and including Specification, Scope of Claims, Drawings, and Abstracts. The disclosed contents of the Japanese Patent Application Nos. 2012-182584, 2012-182585, 2012-182586, 2012-182587, and 2012-182588 are entirely incorporated therein by reference.

REFERENCE SIGNS LIST

1 Communication terminal
2 Base station
3 Nongeostationary satellite
4 GPS satellite
5 Ground network
6 Service center
7 Satellite tracking control center
8 Forward link line
9 Return link line
10 GPS signal
11 Satellite communication antenna
12 Duplexer
13 Radio receiver
14 QPSK demodulator
15 Error-correcting decoder
16 TDM separator
17 Orbit information receiver
18 Data input terminal
180 Transmission signal generator
19 Data generator
20 Error-correcting encoder
21 CDMA spreader (signal generator)
22 Orthogonal code generator 23 Transmission time generator
240 Delay processor
24 Delay corrector
250 Doppler frequency processor
25 BPSK modulator
26 Carrier wave generator
27 Radio transmitter
28 Doppler frequency calculator
29 Delay time calculator
30 GPS antenna
310 Information acquirer
31 GPS receiver
32 GPS signal processor
33 Moving speed calculator
34 Received data output terminal
41 Ground interface
42 Data generator
43 TDM multiplexer
44 Control information transmitter
45 Error-correcting encoder
46 QPSK modulator
47 Radio transmitter
48 Duplexer
49 Satellite communication antenna
50 Radio receiver
51 CDMA despreader
52 BPSK demodulator
53 Error-correcting decoder
54 Data processor
55 Reception time generator
56 Input terminal
61 M sequence generator
62 M sequence generator
63 Modulo 2 adder
64 0 inserter
71 Frequency subtracter
72 Frequency multiplier
73 Frequency subtracter

The invention claimed is:

1. A communication system, comprising:
a base station radio-transmitting to multiple communication terminals; and
multiple communication terminals receiving signals transmitted from the base station and radio-transmitting to the base station,
wherein the communication terminals each comprise:
a time acquirer acquiring reference time information common to the multiple communication terminals;
a clock generator generating a chip clock on the basis of the reference time information;
a code generator generating orthogonal codes in time with the timing of the chip clock;
a signal generator spreading transmission signals with the orthogonal codes to generate code division multiple access signals;
a carrier wave generator generating a carrier wave; and
a transmitter modulating the carrier wave generated by the carrier wave generator with the code division multiple access signals and transmitting the carrier wave to the base station, wherein
the clock generator generates a chip clock having a chip duration of which the allowable error is larger than the time accuracy of the reference time information.

2. The communication system according to claim 1, wherein
the signal generator spreads transmission signals including a short message to generate code division multiple access signals at slot times on the basis of the reference time information and common to the communication terminals.

3. The communication system according to claim 1, wherein
the time acquirer acquires reference time information common to the multiple communication terminals using a GPS receiver.

4. A communication system, comprising
a base station radio-transmitting to multiple communication terminals; and
multiple communication terminals receiving signals transmitted from the base station and radio-transmitting to the base station,
wherein the communication terminals each comprise:
a time acquirer acquiring reference time information common to the multiple communication terminals;
a clock generator generating a chip clock on the basis of the reference time information;
a code generator generating orthogonal codes in time with the timing of the chip clock;
a signal generator spreading transmission signals with the orthogonal codes to generate code division multiple access signals;
a carrier wave generator generating a carrier wave; and
a transmitter modulating the carrier wave generated by the carrier wave generator with the code division multiple access signals and transmitting the carrier wave to the base station, wherein
the base station and multiple communication terminals transmit to each other via a satellite,
the communication terminals each comprise a location acquirer acquiring location information of the communication terminal and satellite, and
the code generator subtracts the delay time difference corresponding to the difference between the distance from the location of the communication terminal to the satellite and a reference distance from the reference time information to determine the times to generate the orthogonal codes.

5. The communication system according to claim 4, wherein
the communication terminals each comprise a location acquirer acquiring location information of the communication terminal and satellite; and
a calculator calculating a Doppler frequency shift from change in the distance between the satellite and communication terminal,
wherein the carrier wave generator generates a carrier wave of a frequency obtained by adding the Doppler frequency shift to a reference frequency.

6. The communication system according to claim 4, wherein
the communication terminals each comprise a location acquirer acquiring location information of the communication terminal and satellite; and
a calculator calculating a Doppler frequency shift from change in the distance between the satellite and communication terminal,
wherein the carrier wave generator generates a carrier wave of a frequency obtained by adding the Doppler frequency shift to a reference frequency, and
the calculator calculates the Doppler frequency shift from the moving speed of the satellite with respect to the ground surface.

7. The communication system according to claim 4, wherein
the communication terminals each comprise a location acquirer acquiring location information of the communication terminal and satellite; and
a calculator calculating a Doppler frequency shift from change in the distance between the satellite and communication terminal,
wherein the carrier wave generator generates a carrier wave of a frequency obtained by adding the Doppler frequency shift to a reference frequency, and
the calculator calculates the Doppler frequency shift from the moving speed of the communication terminal with respect to the ground surface.

8. The communication system according to claim 4, wherein
the signal generator spreads transmission signals including a short message to generate code division multiple access signals at slot times on the basis of the reference time information and common to the communication terminals.

9. A communication terminal that is one of multiple communication terminals receiving signals transmitted from a base station and radio-transmitting to the base station, comprising:
a time acquirer acquiring reference time information common to the multiple communication terminals;
a clock generator generating a chip clock on the basis of the reference time information;
a code generator generating orthogonal codes in time with the timing of the chip clock;
a signal generator spreading transmission signals with the orthogonal codes to generate code division multiple access signals;
a carrier wave generator generating a carrier wave; and
a transmitter modulating the carrier wave generated by the carrier wave generator with the code division multiple access signals and transmitting the carrier wave to the base station, wherein
the clock generator generates a chip clock having a chip duration of which the allowable error is larger than the time accuracy of the reference time information.

10. The communication terminal according to claim 9, wherein
the signal generator spreads transmission signals including a short message to generate code division multiple access signals at slot times on the basis of the reference time information and common to the multiple communication terminals.

11. The communication system according to claim 9, wherein
the time acquirer acquires reference time information common to the multiple communication terminals using a GPS receiver.

12. A communication terminal that is one of multiple communication terminals receiving signals transmitted from a base station and radio-transmitting to the base station, comprising:
a time acquirer acquiring reference time information common to the multiple communication terminals;
a clock generator generating a chip clock on the basis of the time reference information;
a code generator generating orthogonal codes in time with the timing of the chip clock;
a signal generator spreading transmission signals with the orthogonal codes to generate code division multiple access signals;
a carrier wave generator generating a carrier wave; and
a transmitter modulating the carrier wave generated by the carrier wave generator with the code division multiple access signals and transmitting the carrier wave to the base station, wherein
the communication terminal mutually communicates with the base station via a satellite,
the communication terminal comprises a location acquirer acquiring location information of the communication terminal and satellite, and
the code generator subtracts the delay time difference corresponding to the difference between the distance from the location of the communication terminal to the satellite and a reference distance from the reference time information to determine the times to generate the orthogonal codes.

13. The communication terminal according to claim 12, wherein
the communication terminal comprises a location acquirer acquiring location information of the communication terminal and satellite; and
a calculator calculating a Doppler frequency shift from change in the distance between the satellite and communication terminal,
wherein the carrier wave generator generates a carrier wave of a frequency obtained by adding the Doppler frequency shift to a reference frequency.

14. The communication terminal according to claim 12, wherein
the communication terminal comprises a location acquirer acquiring location information of the communication terminal and satellite; and
a calculator calculating a Doppler frequency shift from change in the distance between the satellite and communication terminal,
wherein the carrier wave generator generates a carrier wave of a frequency obtained by adding the Doppler frequency shift to a reference frequency, and
the calculator calculates the Doppler frequency shift from the moving speed of the satellite with respect to the ground surface.

15. The communication terminal according to claim 12, wherein
the communication terminal comprises a location acquirer acquiring location information of the communication terminal and satellite; and
a calculator calculating a Doppler frequency shift from change in the distance between the satellite and communication terminal,
wherein the carrier wave generator generates a carrier wave of a frequency obtained by adding the Doppler frequency shift to a reference frequency, and
the calculator calculates the Doppler frequency shift from the moving speed of the communication terminal with respect to the ground surface.

16. The communication terminal according to claim 12, wherein
the signal generator spreads transmission signals including a short message to generate code division multiple access signals at slot times on the basis of the reference time information and common to the multiple communication terminals.

17. A chip clock generation method executed by one of multiple communication terminals receiving signals transmitted from a base station and radio-transmitting to the base station, comprising:

a time acquisition step of acquiring reference time information common to the multiple communication terminals; and a clock generation step of generating a chip clock having a chip duration of which the allowable error is larger than the time accuracy of the reference time information on the basis of the time information.

18. The chip clock generation method according to claim 17, wherein the base station and multiple communication terminals mutually transmit via a satellite, and the chip clock generation method comprises:

a location acquisition step of acquiring location information of the communication terminals and satellite; and a code start time determination step of subtracting the delay time difference corresponding to the difference between the distance from the location of the communication terminal to the satellite and a reference distance from the reference time information to determine the times to generate the orthogonal codes.

19. The chip clock generation method according to claim 17, wherein in the time acquisition step, a GPS receiver is used to acquire reference time information common to the multiple communication terminals.

20. An orthogonal code generation method executed by one of multiple communication terminals receiving signals transmitted from a base station and radio-transmitting to the base station, comprising:

clock generation method according to claim 17; and an orthogonal code generation step of generating orthogonal codes on the basis of the times based on reference time information acquired by the chip clock generation method and common to the multiple communication terminals.

* * * * *